US012587753B2

(12) United States Patent
Shim

(10) Patent No.: US 12,587,753 B2
(45) Date of Patent: Mar. 24, 2026

(54) IMAGE SENSOR AND ELECTRONIC DEVICE INCLUDING THE SAME

(71) Applicant: SAMSUNG ELECTRONICS CO., LTD., Suwon-si (KR)

(72) Inventor: Eunsub Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 18/140,324

(22) Filed: Apr. 27, 2023

(65) Prior Publication Data

US 2023/0362500 A1    Nov. 9, 2023

(51) Int. Cl.
*H04N 25/10* (2023.01)
*H04N 25/42* (2023.01)

(52) U.S. Cl.
CPC ............ *H04N 25/10* (2023.01); *H04N 25/42* (2023.01)

(58) Field of Classification Search
CPC ........ H04N 25/10; H04N 25/42; H04N 25/46; H04N 25/704; H04N 25/778; H01L 27/14603; H01L 27/14612; H01L 27/14641
See application file for complete search history.

(56) References Cited

U.S. PATENT DOCUMENTS 9,508,770 B2 * 11/2016 Yanagita ............... H10F 39/199
9,773,835 B2 * 9/2017 Kato ................. H01L 27/14612

| | | | |
|---|---|---|---|
| 10,177,192 B2 | 1/2019 | Lee | |
| 10,770,503 B2 | 9/2020 | Ito | |
| 10,964,734 B2 * | 3/2021 | Shim | H01L 27/14627 |
| 11,037,967 B2 * | 6/2021 | Kwag | H10F 39/80373 |
| 11,088,187 B2 | 8/2021 | Tatani et al. | |
| 11,184,566 B2 | 11/2021 | Hwang et al. | |
| 2011/0273597 A1 * | 11/2011 | Ishiwata | H04N 25/702 |
| | | | 348/E9.002 |
| 2015/0124139 A1 * | 5/2015 | Ishiwata | H01L 27/14643 |
| | | | 348/308 |
| 2018/0182804 A1 * | 6/2018 | Lee | H10H 20/8232 |
| 2018/0249105 A1 * | 8/2018 | Chen | H04N 25/702 |
| 2019/0131328 A1 * | 5/2019 | Kim | H10F 39/014 |

(Continued)

FOREIGN PATENT DOCUMENTS

| | | |
|---|---|---|
| JP | 2021-097241 A | 6/2021 |
| KR | 10-2018-0076845 A | 7/2018 |
| KR | 10-2020-0119672 A | 10/2020 |

*Primary Examiner* — Timothy J Henn
(74) *Attorney, Agent, or Firm* — Wolf, Greenfield & Sacks, P.C.

(57) ABSTRACT

The present disclosure provides image sensor and electronic devices including image sensors. In some embodiments, the image sensor includes a shared pixel including four subpixels that have a 2×2 structure sharing a floating diffusion (FD) region, a plurality of unit pixels surrounding the FD region and arranged apart from one another through a deep trench isolation, a first transfer transistor disposed adjacent to the FD region in each of the plurality of unit pixels, a reset transistor provided in a first unit pixel of the plurality of unit pixels and disposed at an outer portion of the shared pixel, and a source follower transistor provided in a second unit pixel and disposed at the outer portion of the shared pixel. The FD region is coupled, through a metal wiring, to a source region of the reset transistor and a gate of the source follower transistor.

20 Claims, 18 Drawing Sheets

(56) References Cited

U.S. PATENT DOCUMENTS

| | | | |
|---|---|---|---|
| 2020/0358971 A1 | 11/2020 | Shim et al. | |
| 2021/0175269 A1 | 6/2021 | Fujita et al. | |
| 2021/0375966 A1* | 12/2021 | Baba ..................... | H10F 39/809 |
| 2022/0045110 A1 | 2/2022 | Fujita et al. | |
| 2024/0136371 A1* | 4/2024 | Okawa ................ | H01L 27/1463 |
| 2024/0371901 A1* | 11/2024 | Fujiyama ............. | H10F 39/807 |

\* cited by examiner

IMAGE SENSOR AND ELECTRONIC DEVICE INCLUDING THE SAME

CROSS-REFERENCE TO RELATED APPLICATIONS

This application claims benefit of priority under 35 U.S.C. § 119 to Korean Patent Application No. 10-2022-0056886, filed on May 9, 2022, and Korean Patent Application No. 10-2022-0099506, filed on Aug. 9, 2022, in the Korean Intellectual Property Office, the disclosures of which are incorporated by reference herein in their entireties.

BACKGROUND

1. Field

The present disclosure relates generally to an image sensor, and more particularly, to an image sensor including a shared pixel structure and an electronic device including the image sensor.

2. Description of Related Art

Image sensors may be configured with a plurality of unit pixels arranged in a two-dimensional (2D) array structure. Generally, a unit pixel may be configured with one photodiode and a plurality of pixel transistors. For example, the pixel transistors may include, but not be limited to, a transfer transistor, a reset transistor, a source follower transistor, and a selection transistor. Recently, as a pixel size has become miniaturized, a shared pixel structure where pixel transistors are shared by a plurality of pixels has been applied to image sensors, so as to enlarge an area of a photodiode. For example, as several pixels share pixel transistors, the number of pixel transistors per unit pixel may be reduced, and thus, an actual area of a photodiode may increase.

SUMMARY

The present disclosure provides an image sensor, which may realize an auto focus, high resolution, and high sensitivity of each pixel and may minimize random noise. The present disclosure may also provide an electronic device that includes the image sensor.

The present disclosure is not limited to the aforesaid, but other objects not described herein will be clearly understood by those of ordinary skill in the art from descriptions below.

According to an aspect of the present disclosure, an image sensor is provided. The image sensor includes a shared pixel including four subpixels. The four subpixels have a 2×2 structure sharing a first floating diffusion (FD) region disposed at a center portion thereof. The image sensor further includes a plurality of unit pixels, provided in the shared pixel, that surround the first FD region and are arranged apart from one another through a deep trench isolation (DTI). Each of the plurality of unit pixels include a photodiode (PD). The image sensor further includes a first transfer transistor disposed adjacent to the first FD region in each of the plurality of unit pixels. The image sensor further includes a reset transistor provided in a first unit pixel of the plurality of unit pixels and disposed at an outer portion of the shared pixel. The image sensor further includes a source follower transistor provided in a second unit pixel of the plurality of unit pixels, which is adjacent to the first unit pixel, and is disposed at the outer portion of the shared pixel. The first FD region is coupled, through a metal wiring, to a source region of the reset transistor and a gate of the source follower transistor. Each of at least two first subpixels of the four subpixels comprises at least two unit pixels. Each of the at least two unit pixels of each of the at least two first subpixels are configured to generate auto focus (AF) information using a light sensing signal.

According to an aspect of the present disclosure, an image sensor is provided. The image sensor includes a first FD region disposed at a center portion of a shared pixel corresponding to one color filter. The image sensor further includes eight unit pixels, provided in the shared pixel, that surround and share the first FD region and are arranged apart from one another through a DTI. Each of the eight unit pixels include a PD. The image sensor further includes a first transfer transistor disposed adjacent to the first FD region in each of the eight unit pixels. The image sensor further includes four micro-lenses (MLs) having a 2×2 structure that are disposed on the eight unit pixels in the shared pixel to surround the first FD region. The image sensor further includes a reset transistor provided in a first unit pixel of the eight unit pixels and disposed at an outer portion of the shared pixel. The image sensor further includes a source follower transistor provided in a second unit pixel of the eight unit pixels, which is adjacent to the first unit pixel, and is disposed at the outer portion of the shared pixel. The first FD region is coupled, through a metal wiring, to a source region of the reset transistor and a gate of the source follower transistor. Two unit pixels disposed under each of the four MLs configure a subpixel of the shared pixel and generate a light sensing signal for AF information.

According to an aspect of the present disclosure, an image sensor is provided. The image sensor includes a first FD region disposed at a center portion of a shared pixel corresponding to one color filter. The image sensor further includes six unit pixels, provided in the shared pixel, that surround and share the first FD region and are arranged apart from one another through a DTI. Each of the six unit pixels include a PD. The image sensor further includes a first transfer transistor disposed adjacent to the first FD region in each of the six unit pixels. The image sensor further includes four MLs having a 2×2 structure that are disposed on the six unit pixels in the shared pixel to surround the first FD region. The image sensor further includes a reset transistor provided in a first unit pixel of the six unit pixels and disposed at an outer portion of the shared pixel. The image sensor further includes a source follower transistor provided in a second unit pixel of the six unit pixels, which is adjacent to the first unit pixel, and is disposed at the outer portion of the shared pixel. The first FD region is coupled, through a metal wiring, to a source region of the reset transistor and a gate of the source follower transistor. Two unit pixels disposed under each of a first ML and a second ML of the four MLs, which are symmetric with each other with respect to the first FD region, configure a subpixel of the shared pixel and generate AF information using a light sensing signal, and one unit pixel disposed under each of the other MLs configures a subpixel of the shared pixel.

According to an aspect of the present disclosure, an electronic device is provided. The electronic device includes an imaging unit configured to collect light reflected from an object to generate an optical image, an image sensor configured to convert the optical image into an electric signal, and a processor configured to control the imaging unit and the image sensor. The image sensor includes a shared pixel including four subpixels having a 2×2 structure sharing a first FD region disposed at a center portion thereof. The image sensor further includes a plurality of unit pixels, provided in the shared pixel, that surround the first FD region and are arranged apart from one another through a DTI. Each of the plurality of unit pixels include a PD. The image sensor further includes a first transfer transistor disposed adjacent to the first FD region in each of the plurality unit pixels. The image sensor further includes a reset transistor provided in a first unit pixel of the plurality of unit pixels and disposed at an outer portion of the shared pixel. The image sensor further includes a source follower transistor provided in a second unit pixel of the plurality of unit pixels, which is adjacent to the first unit pixel, and is disposed at the outer portion of the shared pixel. The first FD region is coupled, through a metal wiring, to a source region of the reset transistor and a gate of the source follower transistor. Each of at least two first subpixels of the four subpixels comprises at least two unit pixels. The image sensor is configured to generate AF information by using a light sensing signal of each of the at least two unit pixels of each of the at least two first subpixels.

BRIEF DESCRIPTION OF THE DRAWINGS

The above and other aspects, features, and advantages of certain embodiments of the present disclosure will be more apparent from the following description taken in conjunction with the accompanying drawings in which:

FIGS. 5A to 5C are plan views of a shared pixel of an image sensor, according to an embodiment;

FIGS. 7A to 7C are a plan view and signal timing diagrams for describing high sensitivity and an auto focus operation in the image sensor of FIG. 5B, according to an embodiment;

FIG. 9 is a block structure diagram of an electronic device including an image sensor, according to an embodiment.

DETAILED DESCRIPTION

Figure 1A:
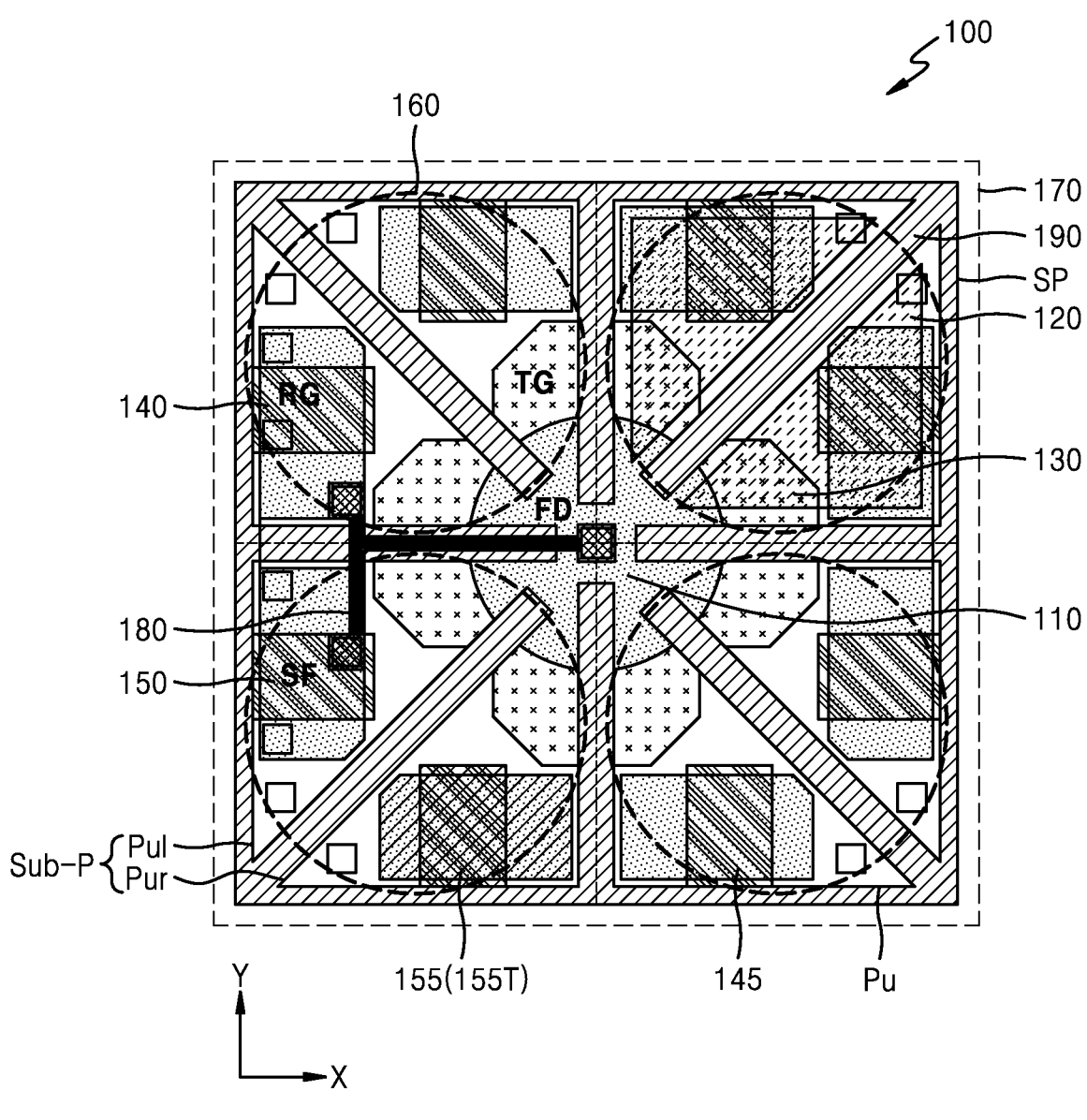
FIG. 1A is a plan view of a shared pixel of an image sensor, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first," "second," "third" to be used to describe relative positions of elements. The terms "first," "second," "third" may be used to described various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

Figure 1B:
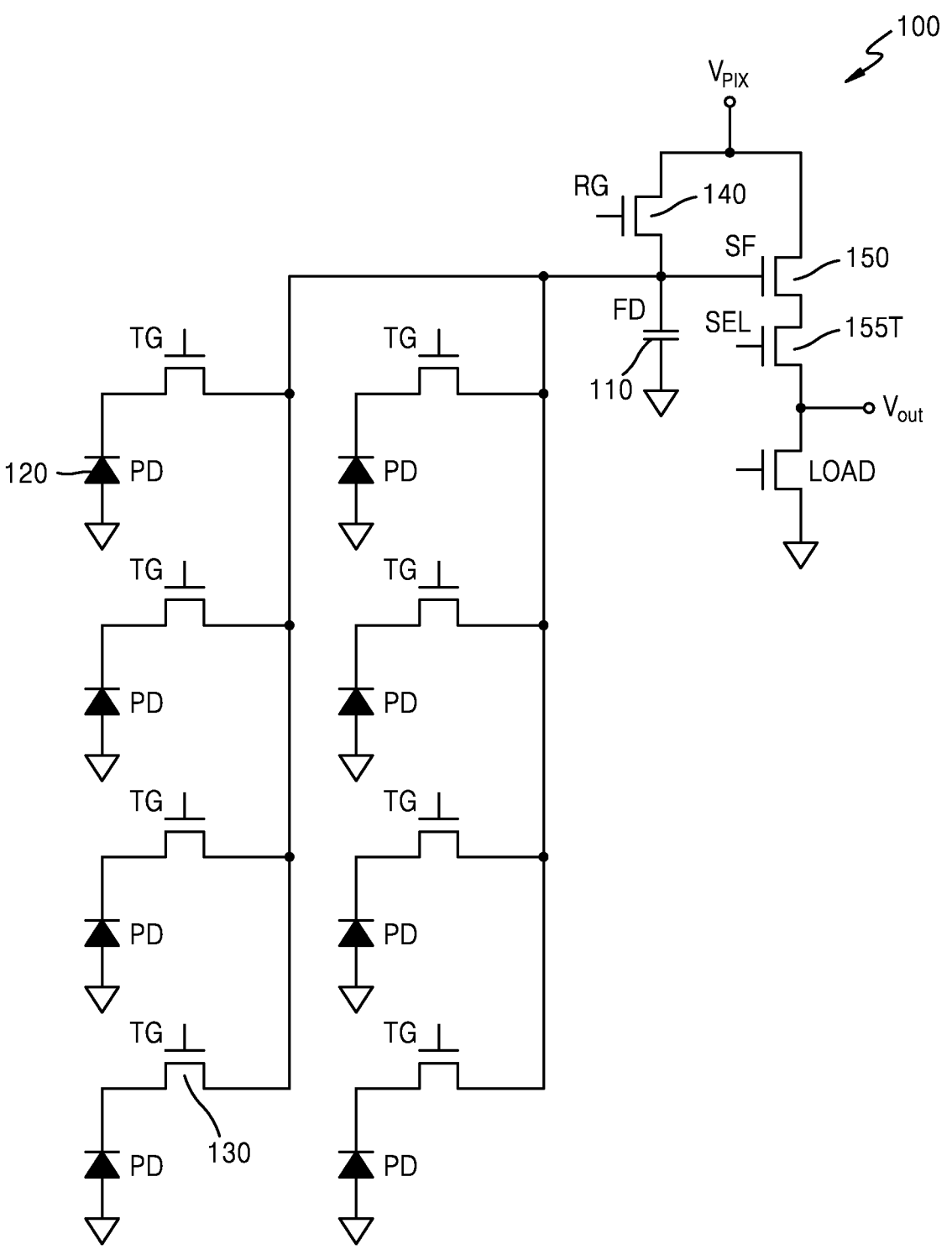
FIG. 1B is an equivalent circuit diagram corresponding to a shared pixel of the image sensor of FIG. 1A, according to an embodiment.

FIG. 1A is a plan view of a shared pixel of an image sensor 100, according to an embodiment. FIG. 1B is an equivalent circuit diagram corresponding to a shared pixel of the image sensor 100 of FIG. 1A, according to an embodiment.

Referring to FIGS. 1A and 1B, the image sensor 100, according to an embodiment, may include a plurality of shared pixels SP, which may be arranged in a two-dimensional (2D) array structure on a substrate. Each of the shared pixels SP may include eight unit pixels Pu. Alternatively or additionally, each of the shared pixels SP may include a floating diffusion (FD) region 110, a photodiode (PD) 120, a transfer transistor 130, and a plurality of pixel transistors (e.g., 140, 150, and 155T).

The unit pixels Pu may be disposed apart from one another through a deep trench isolation (DTI) 190. Alternatively or additionally, the PD 120 may be disposed in each of the unit pixels Pu. As illustrated in FIG. 1A, the unit pixel Pu may one-dimensionally have an approximately triangular shape in a plan view, and thus, the PD 120 may one-dimensionally have an approximately triangular shape also in the plan view. However, a shape of each of the unit pixel Pu and the PD 120 is not limited thereto. Furthermore, in FIG. 1A, for convenience of illustration, the PD 120 is illustrated in a triangular shape through hatching in only two unit pixels Pu of a subpixel Sub-P of a first quadrant surface and is not illustrated in the other unit pixels.

The shared pixel SP may have a rectangular shape and may include a region corresponding to one color filter 170. That is, one same color filter 170 may be disposed on the PDs 120 of the unit pixels Pu configuring the shared pixel SP. As a result, light having the same wavelength range may be incident on the PDs 120 of the unit pixels Pu of the shared pixel SP.

The shared pixel SP may include a plurality of subpixels Sub-P. The subpixel Sub-P may denote a pixel within a range covered by one micro-lens (ML) 160. The subpixel Sub-P may include one unit pixel Pu and/or may include a plurality of unit pixels Pu.

In the image sensor 100, according to an embodiment, the shared pixel SP may include four subpixels Sub-P. Alternatively or additionally, each of the subpixels Sub-P may include two unit pixels Pu. However, the number of subpixels included in the shared pixel SP and/or the number of unit pixels included in the subpixel Sub-P are not limited thereto.

In a case where the unit pixel Pu is clearly differentiated from the PD 120, the unit pixel Pu may include the PD 120, a portion of the FD region 110, the transfer transistor 130, and one of the pixel transistors (e.g., 140, 150, and 155T). Alternatively or additionally, in a vertical shape, the transfer transistor 130 and the pixel transistors 140, 150, and 155T may be disposed on a surface of the substrate, and the PD 120 may be disposed under the surface of the substrate. For example, the PD 120 may be disposed under the transfer transistor 130 and the pixel transistors 140, 150, and 155T. The transfer transistor 130 may have a vertical gate structure and may be connected (e.g., electrically coupled) to the PD 120. However, in terms of a planar shape and/or a separation structure, the unit pixel Pu may be substantially the same as the PD 120. Hereinafter, unless specially differentiated, the unit pixel Pu and the PD 120 may refer to a same element. In some embodiments, in some unit pixels, at least one of the pixel transistors 140, 150, and 155T, except the transfer transistor 130, may not operate as a dummy transistor.

The FD region 110 may be disposed at a center portion of the shared pixel SP. Alternatively or additionally, the FD region 110 may be shared by the PDs 120 of the shared pixel SP. That is, electric charges generated by the PDs 120 of the shared pixel SP may be stored in the FD region 110 and may be used as an image signal. As shown in FIG. 1A, in an embodiment, the FD region 110 may have a shape surrounded by the DTI 190 dividing the subpixels Sub-P. Alternatively or additionally, the FD region 110 may extend to each unit pixel Pu region by using the DTI 190 dividing two unit pixels Pu in the subpixel Sub-P. However, the planar shape of the FD region 110 is not limited by the illustration of FIG. 1A. For example, the FD region 110 may have various shapes physically connected with one another as one body.

The shared pixel SP of the image sensor 100, according to an embodiment, may switch between a high resolution mode and a high sensitivity mode. In the present disclosure, the high resolution mode may refer to a mode which independently uses light sensing signals of each unit pixel Pu and/or each subpixel Sub-P. In the present disclosure, the high sensitivity mode may refer to a mode which merges and uses light sensing signals of unit pixels configuring the shared pixel SP. That is, in the high resolution mode, an electric charge generated by the PD 120 of each unit pixel Pu and/or sub-pixel Sub-P of the shared pixel SP may be used as each image signal via the FD region 110. Alternatively or additionally, in the high sensitivity mode, the electric charges generated by the PDs 120 of the unit pixels Pu of the shared pixel SP may be accumulated into the FD region 110 together and may be used as an image signal.

The transfer transistor 130 may be disposed in each of the unit pixels Pu of the shared pixel SP. The shared pixel SP may include eight unit pixels Pu and eight PDs 120, and thus, eight transfer transistors 130 may be disposed in the shared pixel SP. The transfer transistor 130 may transfer an electric charge, generated by a corresponding PD 120, to the FD region 110. As shown in FIG. 1A, a transfer gate TG, a PD 120 corresponding thereto, and the FD region 110 may configure the transfer transistor 130.

The shared pixel SP may include pixel transistors for transferring a signal corresponding to an electric charge stored in the FD region 110. The pixel transistors may include, for example, a reset transistor 140, a source follower transistor 150, and a selection transistor 155T. In FIG. 1A, a reset gate RG of the reset transistor 140 is illustrated, and a source follower gate SF of the source follower transistor 150 is illustrated. The reset gate RG and high-concentration doping regions disposed at both sides thereof may configure the reset transistor 140, and the source follower gate SF and high-concentration doping regions disposed at both sides thereof may configure the source follower transistor 150.

As illustrated in FIG. 1A, dummy gates 145 and 155 that may be similar to the reset gate RG and/or the source follower gate SF may be provided in each unit pixel Pu where the reset gate RG and/or the source follower gate SF is not provided. The dummy gates 145 and 155 may be variously used. For example, in the image sensor 100, according to an embodiment, a subpixel Sub-P of a third quadrant surface may include a left unit pixel Pul and a right unit pixel Pur, and the source follower transistor 150 may be provided in the left unit pixel Pul. Alternatively or additionally, the dummy gate 155 provided in the right unit pixel Pur may be used as a selection gate. Therefore, the selection transistor 155T configured with the dummy gate 155 may be disposed adjacent to the source follower transistor 150. Alternatively or additionally, the dummy gates 145 and 155 may be used as a selection gate, and/or may be used for another operation in the image sensor 100. For example, the dummy gates 145 and 155 may be used for implementing a dual conversion gain (CG) and/or a triple CG of the shared pixel SP. In the present disclosure, a CG may refer to a ratio where an electric charge generated by the PD moves to and is accumulated into the FD region, and then, is converted into a voltage. In a case where the source follower gate SF is provided in plurality, the dummy gates 145 and 155 may be used as an additional source follower gate SF.

In the shared pixel SP, the FD region 110 may be connected to a source region of the reset transistor 140 and the source follower gate SF of the source follower transistor 150 through a metal wiring 180. Such a connection relationship may be understood through the circuit diagram of FIG. 1B. For reference, in FIG. 1A, small square boxes may represent a contact. The metal wiring 180 and an output line may be connected to a corresponding element through the contact.

In FIG. 1A, only one shared pixel SP is illustrated, but the image sensor 100, according to an embodiment, may include a plurality of shared pixels SP (e.g., pixel array 1100 of FIG. 8) arranged in a 2D array structure. That is, in the image sensor 100, according to an embodiment, the shared pixels SP may each be arranged in plurality in a first direction (e.g., an X direction) and/or a second direction (e.g., a Y direction).

In the image sensor 100, according to an embodiment, eight unit pixels Pu may configure one shared pixel SP. Therefore, the shared pixel SP may have a structure where eight PDs 120 surround and share one FD region 110. In the shared pixel SP, as shown in the equivalent circuit diagram of FIG. 1B, the one FD region 110 may be shared by the eight PDs 120 through a transfer transistor 130 corresponding to each PD 120.

In some embodiments, sharing performed in the shared pixel SP may refer to the eight PDs 120 sharing the reset transistor 140, the source follower transistor 150, and the selection transistor 155T. Alternatively or additionally, sharing in the shared pixel SP may refer to the eight PDs 120 sharing the one FD region 110. As described above, the selection transistor 155T may be implemented by the dummy gate 155 disposed adjacent to the source follower transistor 150.

The source region of the reset transistor 140 may be connected to the FD region 110 through the metal wiring 180 to form an equivalent potential with the FD region 110. Accordingly, the source region of the reset transistor 140 may be referred to as an equivalent FD region. Alternatively or additionally, the source follower gate SF of the source follower transistor 150 may be connected to the FD region 110 through the metal wiring 180. Therefore, the FD region 110, the source region of the reset transistor 140, and the source follower gate SF may all form an equivalent potential.

To describe a connection relationship between the FD region 110, the PDs 120, and the transistors 130, 140, 150, and 155T with reference to the equivalent circuit diagram of FIG. 1B, the eight PDs 120 may be respectively connected to the source regions of the eight transfer transistors 130 corresponding thereto. A drain region of each of the transfer transistors 130 may be connected to the source region of the reset transistor 140. As described above, the source region of the reset transistor 140 may correspond to the FD region 110. As a result, a common drain region of the transfer transistors 130 may correspond to the FD region 110. The FD region 110 may be connected to the source follower gate SF of the source follower transistor 150. As shown in FIG. 1B, the drain region of the reset transistor 140 and the drain region of the source follower transistor 150 may be connected with a source voltage Vpix. Alternatively or additionally, a source region of the source follower transistor 150 may be connected with the drain region of the selection transistor 155T. Furthermore, an output line may be connected with the source region of the selection transistor 155T, and thus, a voltage of the source region of the selection transistor 155T may be output as an output voltage Vout. A transistor LOAD may denote a total load connected to the source region of the selection transistor 155T, but is not limited to a transistor.

In the image sensor 100, according to an embodiment, a unit shared pixel may be configured with one shared pixel SP and one TR set corresponding thereto. Transfer transistors 130 corresponding to the number of shared PDs 120 may be provided in the shared pixel SP. The TR set may include the reset transistor 140, the source follower transistor 150, and the selection transistor 155T. The transistors 140, 150, and 155T of the TR set may be referred to as a pixel transistor, and/or the transistors 140, 150, and 155T of the TR set and the transfer transistor 130 may be referred to as a pixel transistor. The image sensor 100, according to an embodiment, may include, but not be limited to, a complementary metal oxide semiconductor (CMOS) image sensor.

In the image sensor 100, according to an embodiment, one FD region 110 physically connected to PDs 120 may be provided in a center portion of the shared pixel SP, and the FD region 110 may be connected with the source region of the reset transistor 140 and the source follower gate SF of the source follower transistor 150 through the metal wiring 180. Accordingly, the image sensor 100, according to an embodiment, may maintain a high CG and may minimize random noise (RN). Alternatively or additionally, in the image sensor 100, according to an embodiment, each of the subpixels Sub-P of the shared pixel SP may include two unit pixels Pu corresponding to one ML and two PDs 120 based thereon, and thus, the image sensor 100 may implement an auto focus (AF) of a shared pixel. CG and RN are described with reference to FIGS. 2A to 3B, and implementation of an AF is described with reference to FIGS. 5A to 7C.

Figure 2A:
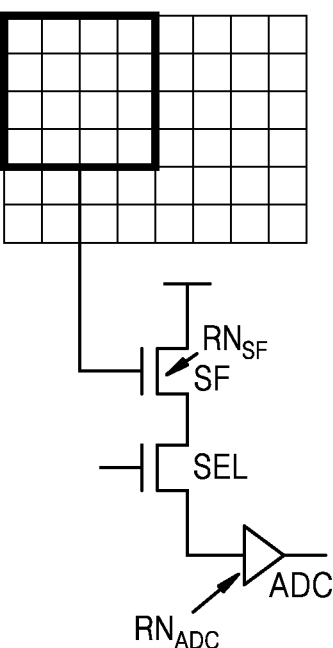
FIGS. 2A and 2B are a conceptual diagram for describing a charge sum scheme in association with implementation of high sensitivity and a schematic plan view of a shared pixel corresponding thereto, according to an embodiment.
Figure 2B:
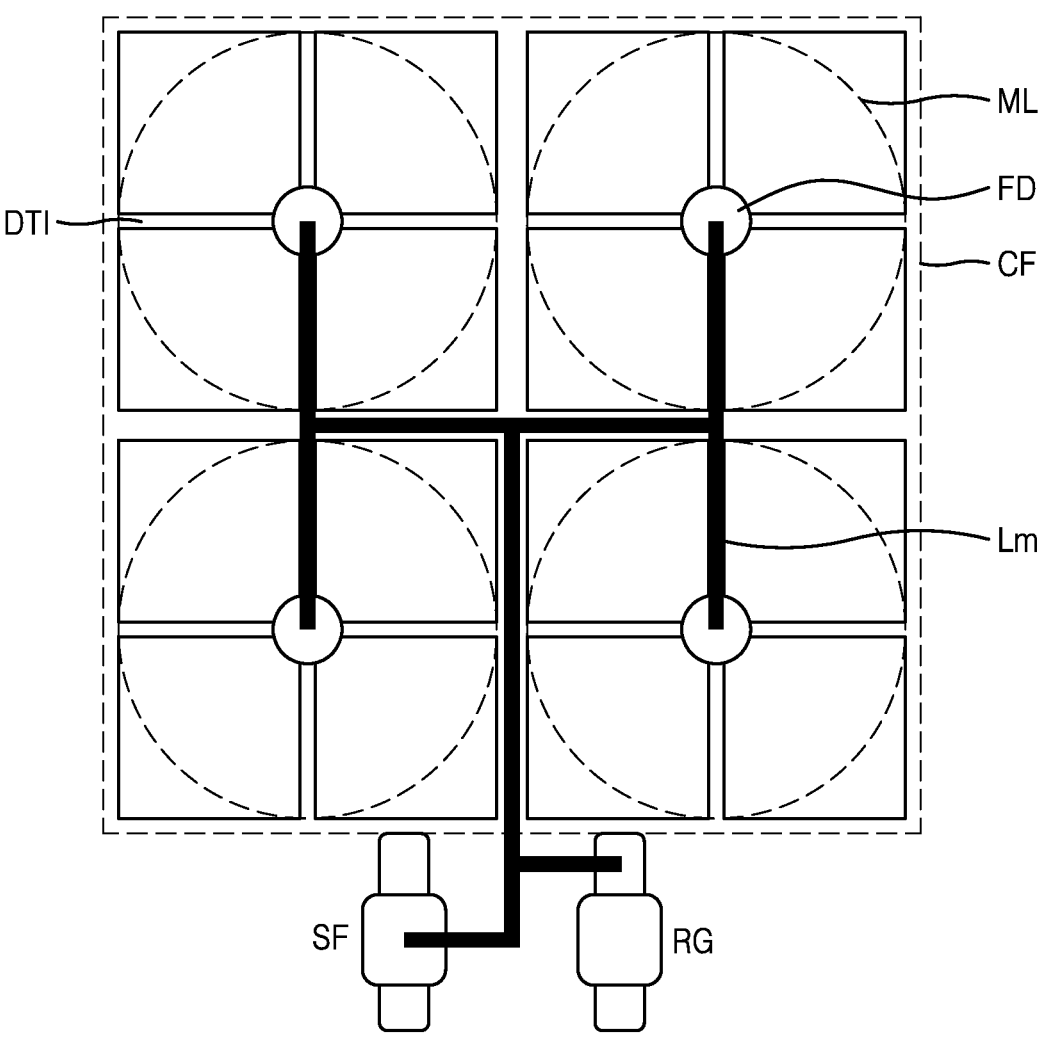

For example, a related image sensor may have a structure where a shared pixel includes four subpixels, FD regions are respectively provided in the subpixels, and the FD regions are connected with a source region of a reset transistor and a source follower gate of a source follower transistor through a metal wiring (e.g., metal wiring Lm of FIG. 2B). In the related image sensor, a CG may be reduced due to an increase in a length of a metal wiring and four junctions corresponding to FD regions. Alternatively or additionally, to compensate for the reduced CG, a structure where an output is provided for each two subpixels may be considered, but in such a structure, while the CG may increase, the RN may also increase. Hereinafter, CG and RN are described with reference to FIGS. 2A to 3C.

Alternatively or additionally, in the image sensor 100, according to an embodiment, one FD region 110 may be disposed at a center of the shared pixel SP and the FD region 110 may be connected with the source region of the reset transistor 140 and the source follower gate SF of the source follower transistor 150 through the metal wiring 180, and thus, a reduction of the CG may be prevented without a corresponding increase of the RN.

FIGS. 2A and 2B are a conceptual diagram for describing a charge sum scheme in association with implementation of high sensitivity and a schematic plan view of a shared pixel corresponding thereto. A source follower transistor SF and a reset transistor RG may be provided in a shared pixel, but in FIG. 2B, may be provided outside the shared pixel for convenience. Hereinafter, a similar structure is described with reference to FIGS. 3B, 5A to 5C, 6A, and 7A.

Referring to FIGS. 2A and 2B, a charge sum scheme may be a scheme which summates electric charges generated by PDs of unit pixels and obtains an image signal by using one source follower transistor SF and one analog-to-digital converter (ADC). When RN occurring in the source follower transistor SF is referred to as $RN_{SF}$ and RN occurring in the ADC is referred to as $RN_{ADC}$, the total RN $RN_{TO}$ may be expressed as the following Equation 1.

$$RN_{TO} = \frac{1}{CG} \times N \times \sqrt{\frac{(RN_{SF})^2}{N} + (RN_{ADC})^2} \qquad \text{[Equation 1]}$$

Here, CG may denote a conversion gain, and N may denote the number of source follower transistors SF. Therefore, in a scheme which implements high sensitivity by using the charge sum scheme as in FIG. 2A, one source follower transistor SF may be used, and thus, N may be 1. As a result, total RN $RN_{TO}$ may be small.

In order to implement the charge sum scheme, for example, a shared pixel having a structure illustrated in FIG. 2B may be used. Here, CF may denote a color filter. To briefly describe a structure of the shared pixel of FIG. 2B, the shared pixel may include four subpixels, and moreover, each of the subpixels may have a structure having four unit pixels. Depending on the case, each of the subpixels may include two unit pixels. An FD region FD may be disposed at a center of each of the subpixels. Therefore, as illustrated by a black line in FIG. 2B, a metal wiring Lm may be formed to be long so that a sum of electric charges of four FD regions FD is transferred to a gate of one source follower transistor SF. Furthermore, the CG may be inversely proportional to a capacitor of the FD region FD and a capacitor formed by the metal wiring Lm. Accordingly, in implementing high sensitivity based on the charge sum scheme, a capacitor may be increased by the four FD regions FD and the long metal wiring Lm, and due to this, a CG may be reduced.

Figure 3A:
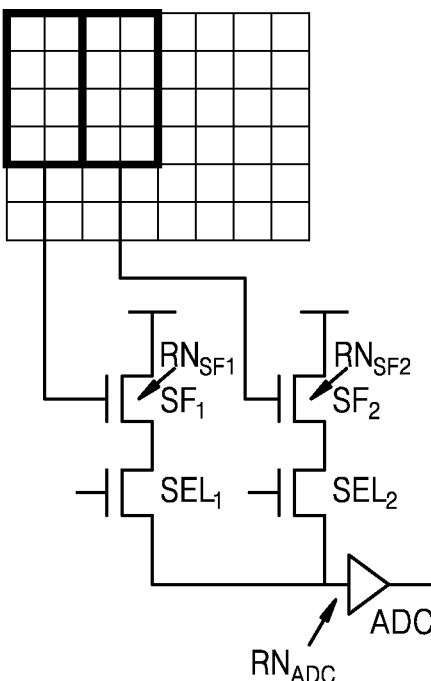
FIGS. 3A and 3B are a conceptual diagram for describing an analog averaging scheme in association with implementation of high sensitivity and a schematic plan view of a shared pixel corresponding thereto, according to an embodiment.
Figure 3B:
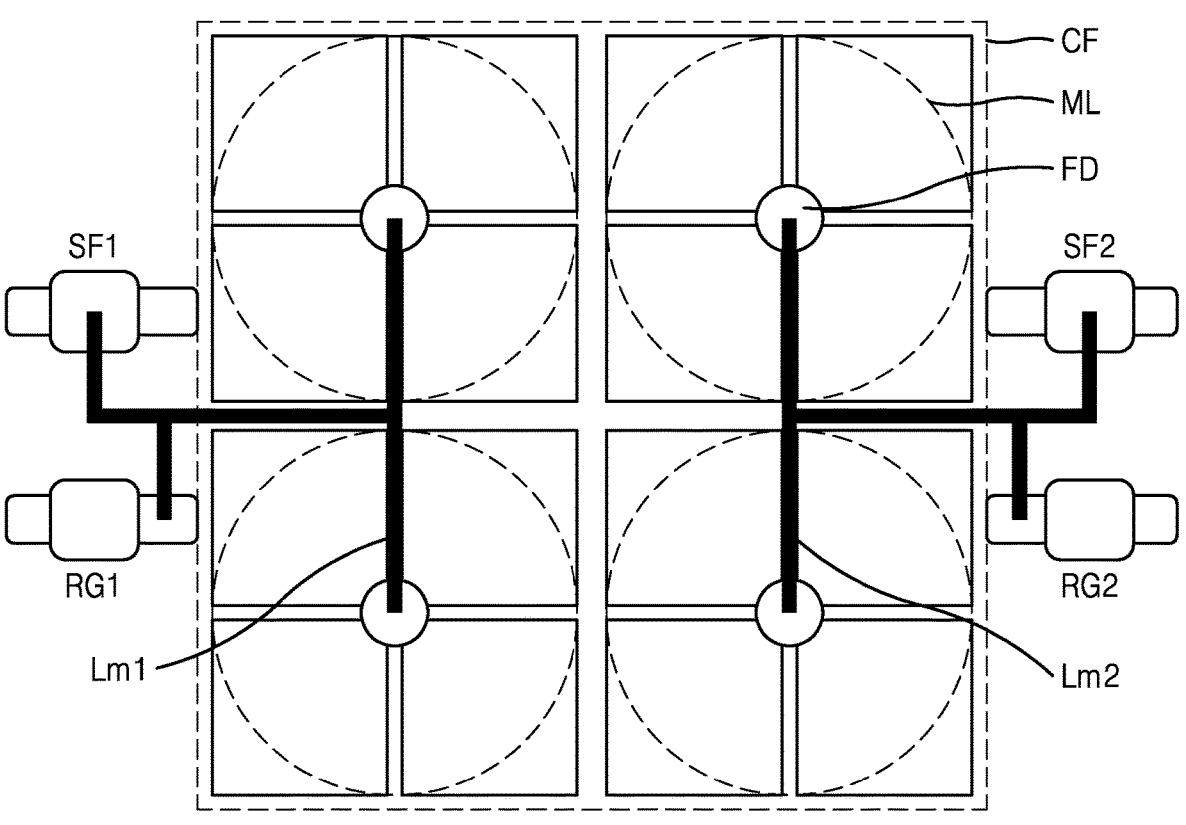

FIGS. 3A and 3B are a conceptual diagram for describing an analog averaging scheme in association with implementation of high sensitivity and a schematic plan view of a shared pixel corresponding thereto.

Referring to FIGS. 3A and 3B, the analog averaging scheme may be a scheme which summates electric charges generated by PDs of the unit pixels for each of some subpixels and obtains an image signal by using a corresponding number of source follower transistors SF and one ADC. In a case where total RN $RN_{TO}$ is calculated by using Equation 1, N may correspond to the number of source follower transistors SF, and thus, the total RN $RN_{TO}$ may increase as the number of source follower transistors SF increases.

In order to implement the analog averaging sum scheme, for example, a shared pixel having a structure illustrated in FIG. 3B may be used. To briefly describe a structure of the shared pixel of FIG. 3B, the shared pixel may include four subpixels, and moreover, each of the subpixels may have a structure having four unit pixels. Furthermore, electric charges of two left subpixels may be transferred to a gate of a first source follower transistor SF1 through a first metal wiring Lm1, and electric charges of two right subpixels may be transferred to a gate of a second source follower transistor SF2 through a second metal wiring Lm2. As described above, N may be 2, and thus, the total RN $RN_{TO}$ may increase based on the charge sum scheme. However, a CG corresponding to each of the first and second source follower transistors SF1 and SF2 may increase based on two FD regions FD and the first and second metal wirings Lm1 and Lm2. Alternatively or additionally, a sum of electric charges may be transferred to each of gates of the first and second source follower transistors SF1 and SF2, and thus, the charge sum scheme may be included in the analog averaging scheme.

As a result, the charge sum scheme may cause a CG to be reduced, and the analog averaging scheme may cause a RN to be increased. Alternatively or additionally, as shown in FIG. 1A, in a structure of the shared pixel SP of the image sensor 100, according to an embodiment, one FD region 110 may be disposed at a center of the shared pixel SP and the FD region 110 may be connected to a gate of one source follower transistor 150 through the metal wiring 180 having a short length, and thus, preventing a CG to be reduced and preventing a RN to be increased. That is, a capacitor may be minimized by the one FD region 110 and the metal wiring 180 having a short length, and thus, a high CG may be maintained. Alternatively or additionally, because one source follower transistor 150 is used, RN may be minimized.

Figure 4A:
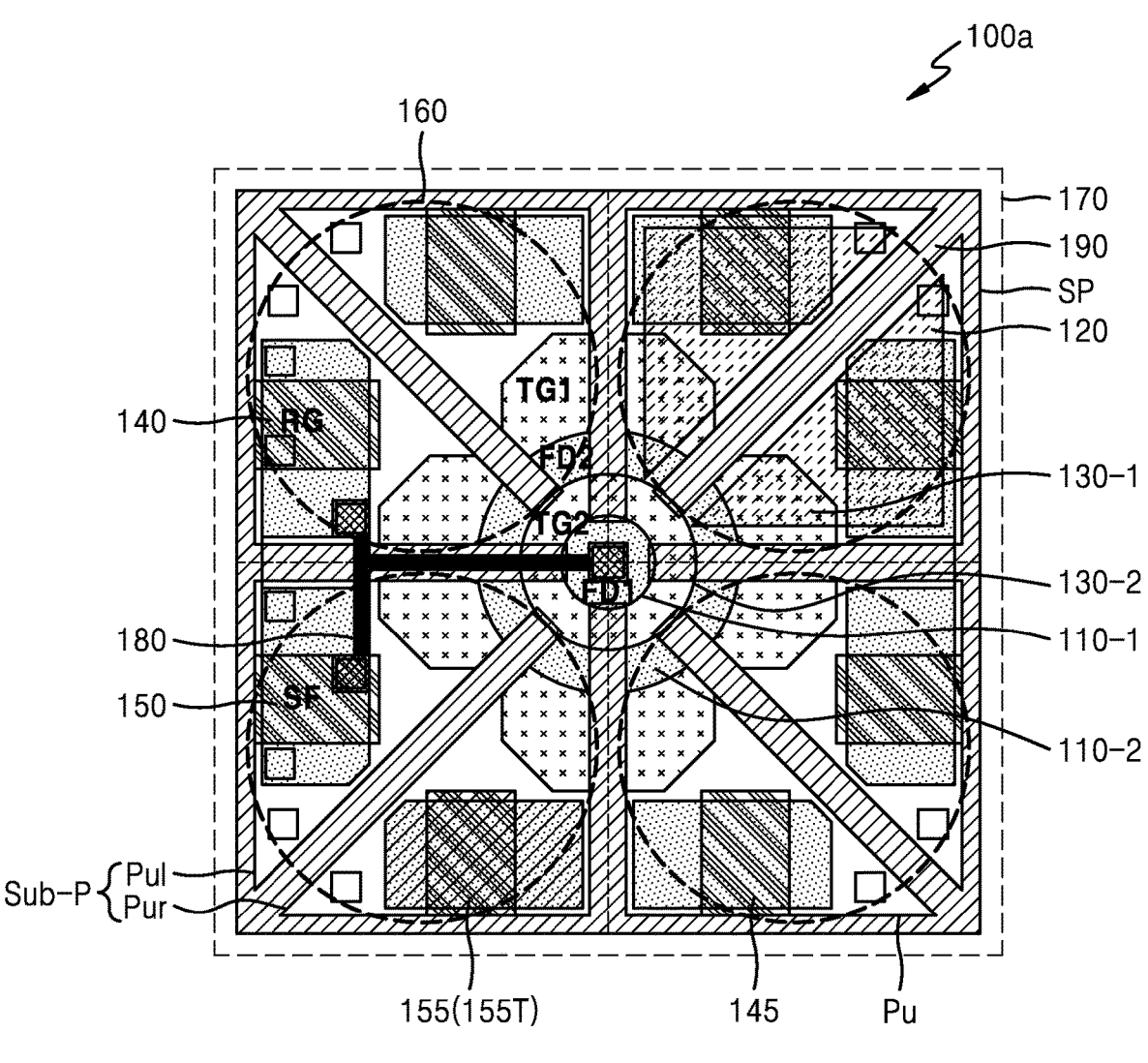
FIG. 4A is a plan view of a shared pixel of an image sensor, according to an embodiment.
Figure 4B:
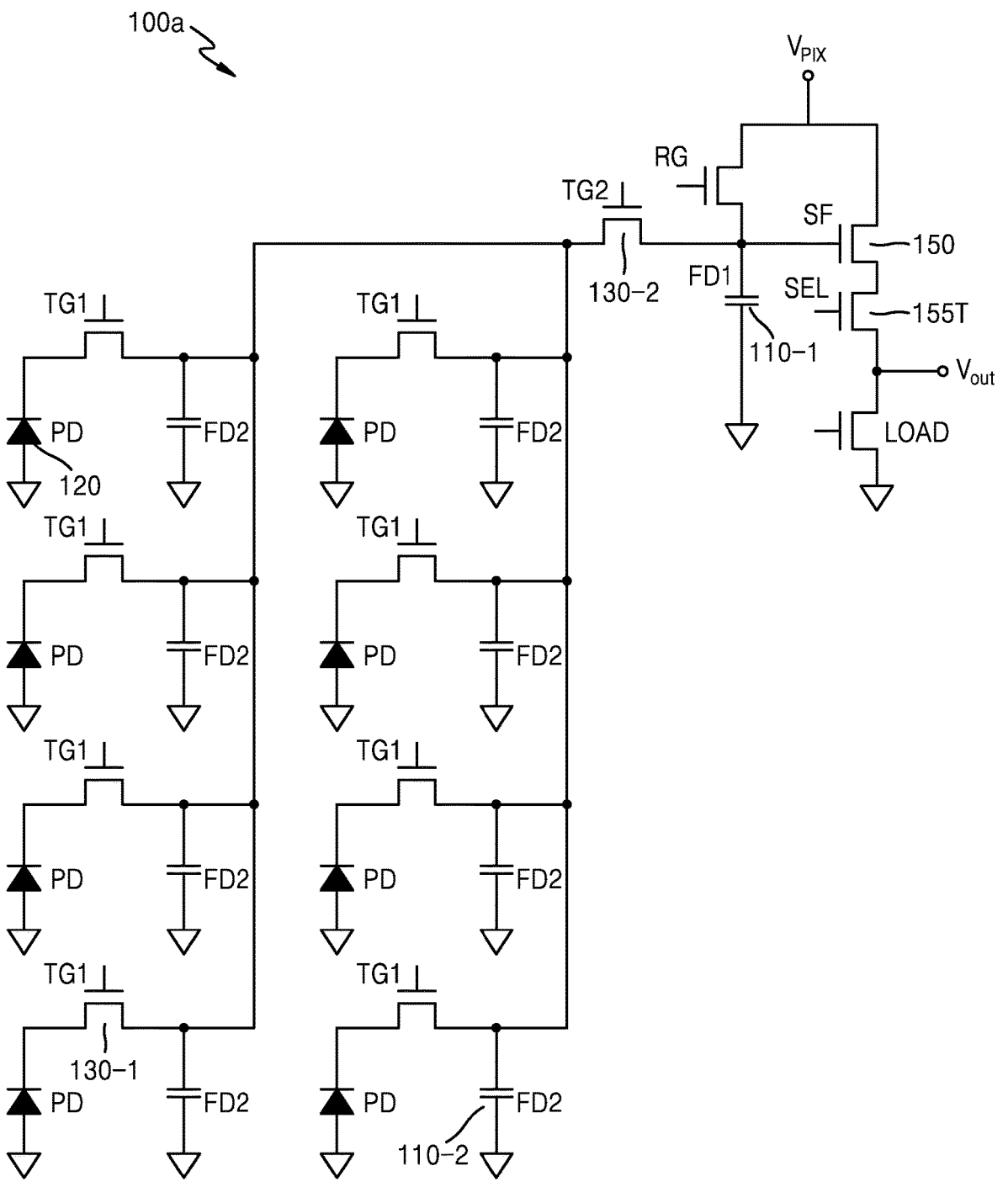
FIG. 4B is an equivalent circuit diagram corresponding to a shared pixel of the image sensor of FIG. 4A, according to an embodiment.

FIG. 4A is a plan view of a shared pixel SPa of an image sensor 100a, according to an embodiment. FIG. 4B is an equivalent circuit diagram corresponding to the shared pixel SPa of the image sensor 100a of FIG. 4A, according to an embodiment. The image sensor 100a of FIG. 4A may include or may be similar in many respects to at least one of the image sensors described above with reference to FIGS. 1A to 3B and may include additional features not mentioned above. As such, for the sake of brevity, descriptions of features described with reference to FIGS. 1A to 3B are briefly given below or omitted.

Referring to FIGS. 4A and 4B, comparing with the structure of the shared pixel SP of the image sensor 100 of FIG. 1A, a structure of the shared pixel SPa of the image sensor 100a, according to an embodiment, may differ in number and arrangement structure of FD regions and transfer transistors. For example, the shared pixel SPa of the image sensor 100a may include a first FD region 110-1 disposed at a center portion of the shared pixel SPa and a second FD region 110-2 provided in each of unit pixels Pu. Alternatively or additionally, the shared pixel SPa may include a first transfer transistor 130-1 provided in each unit pixel Pu and a second transfer transistor 130-2 disposed at the center portion of the shared pixel SPa.

In the shared pixel SP of the image sensor 100 of FIG. 1A, the FD region 110 may have a structure which extends up to each unit pixel Pu from a center portion of a shared pixel and may have a completely connected structure. Alternatively or additionally, an electric charge generated by the PD 120 of each unit pixel Pu may be transferred to the FD region 110 through a corresponding transfer transistor 130.

In order to increase charge transfer efficiency, in the image sensor 100a, according to an embodiment, the second transfer transistor 130-2 may be further provided in the shared pixel SPa. The second transfer transistor 130-2 may have a circular-ring shape where elements are connected with one another as one body and may surround the first FD region 110-1. Therefore, the second transfer transistor 130-2 may divide the FD region 110 into a first FD region 110-1 and a second FD region 110-2. That is, as shown in the equivalent circuit diagram of FIG. 4B, due to the arrangement of the second transfer transistor 130-2, the second FD region 110-2 corresponding to each of the PDs 120 may be disposed with the first transfer transistor 130-1 therebetween. Therefore, an electric charge generated by the PD 120 of each unit pixel Pu may be transferred to the second FD region 110-2 through the first transfer transistor 130-1 and may be transferred to the first FD region 110-1 through the second transfer transistor 130-2. As described above, a 2-stage charge transfer may be performed through the first and second transfer transistors 130-1 and 130-2, thereby increasing charge transfer efficiency.

Because only an FD region (e.g., the first FD region 110-1) as shown directly from a gate of the source follower transistor 150 is reflected in a CG, the CG may not largely be affected by a case where the FD region 110 is divided into the first FD region 110-1 and the second FD region 110-2. Alternatively or additionally, because one source follower transistor 150 and the metal wiring 180 having a short length are used, RN may remain small when compared to related image sensors.

Figure 5A:
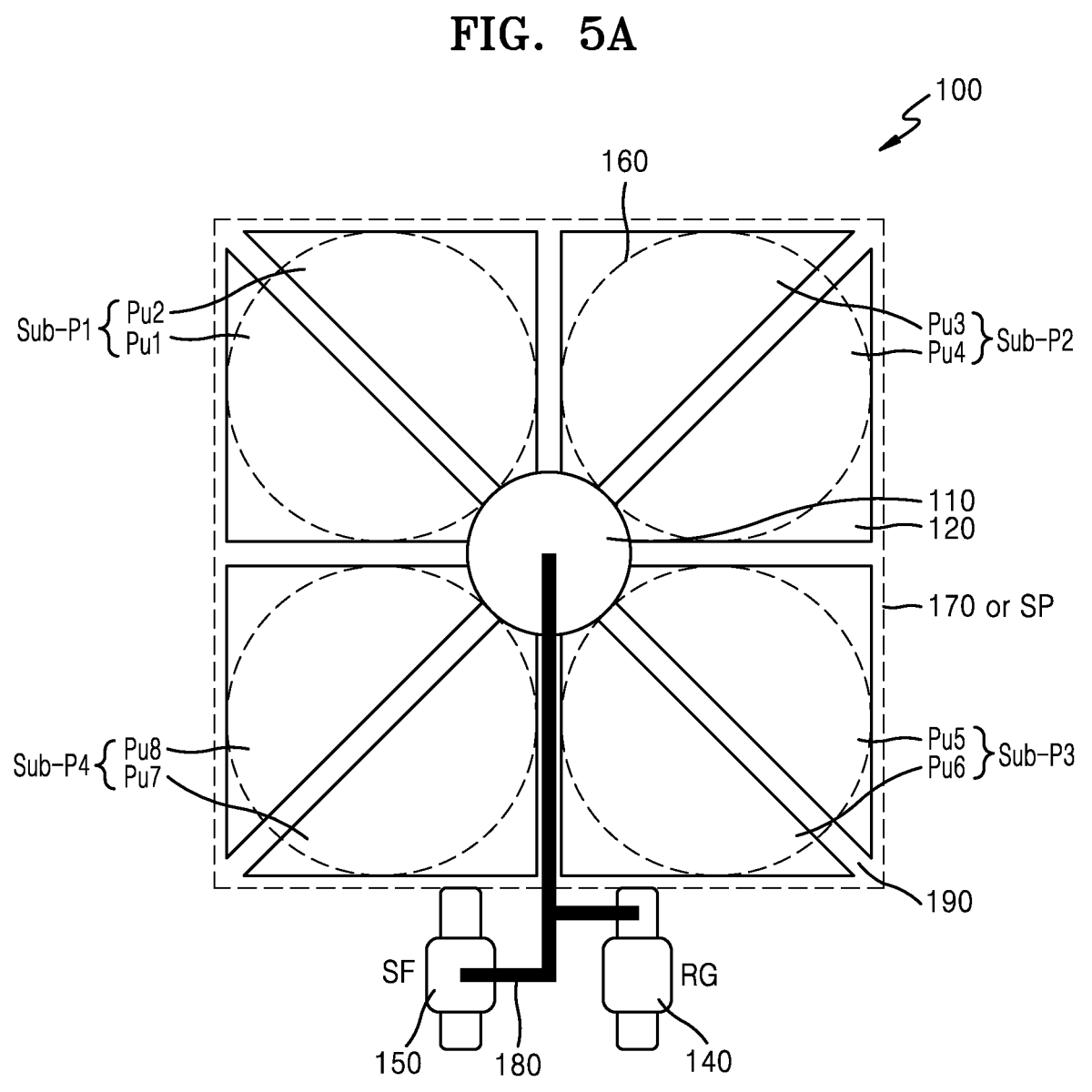
Figure 5B:
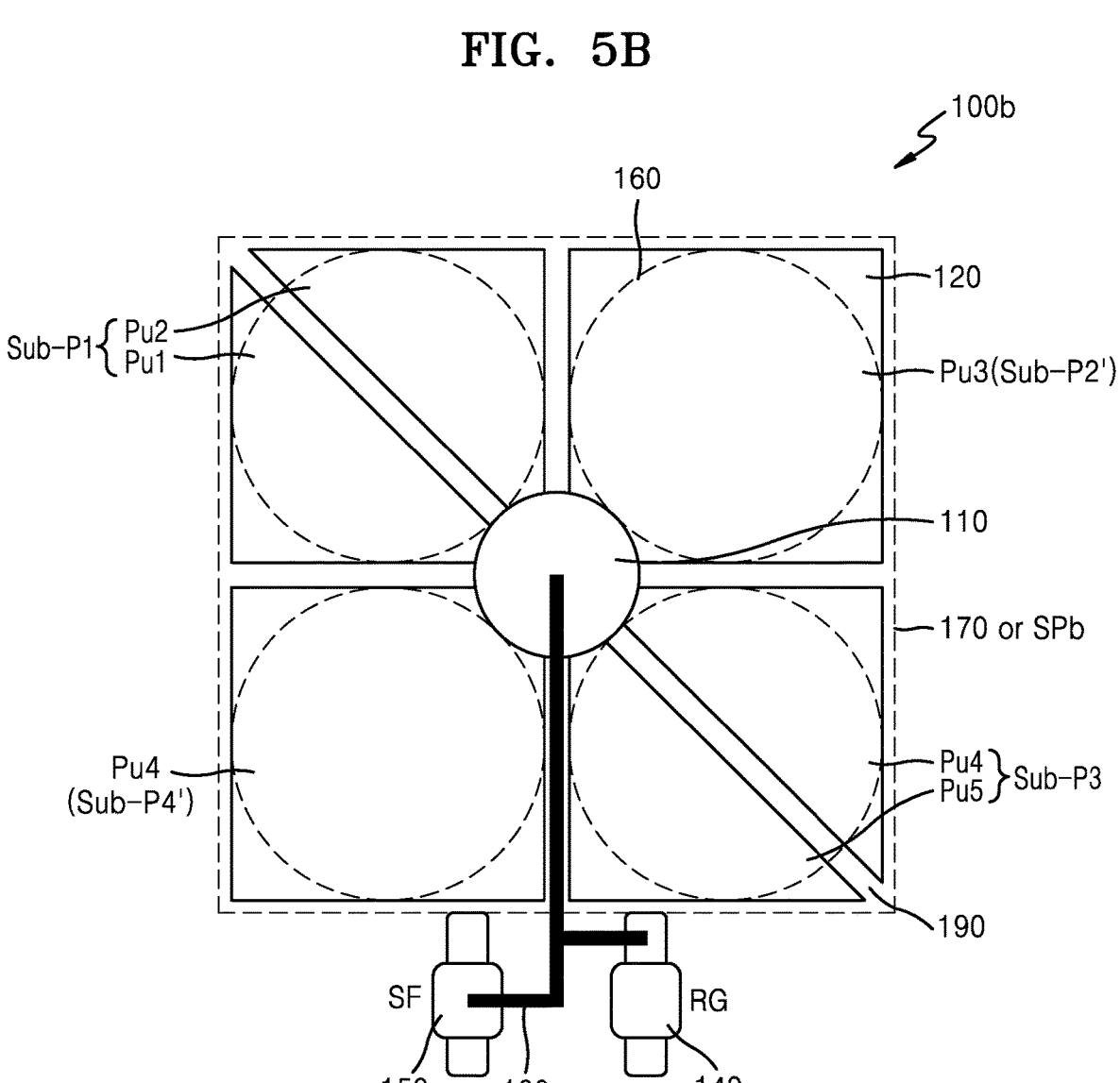
Figure 5C:
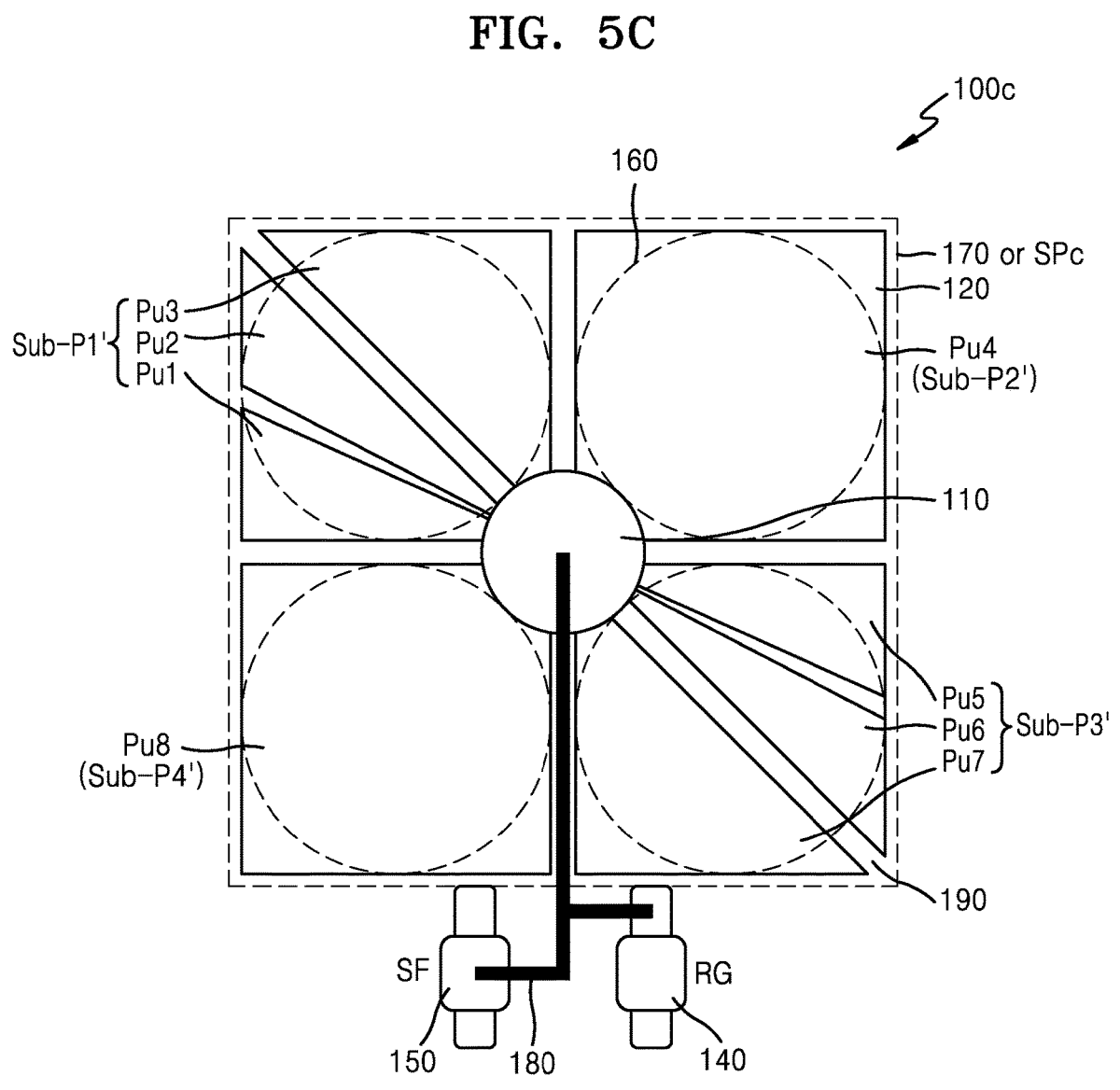

FIGS. 5A to 5C are plan views of a shared pixel of an image sensor, according to an embodiment, and illustrate a structure of shared pixels differentiated from one another in terms of an AF operation. Alternatively or additionally, FIGS. 5A to 5C schematically illustrate a structure of a shared pixel SP for convenience and illustrate a case where a reset transistor 140 and a source follower transistor 150 are provided outside the shared pixel SP, based on only an AF operation. The image sensor 100 of FIG. 5A may include or may be similar in many respects to at least one of the image sensors described above with reference to FIGS. 1A to 4B and may include additional features not mentioned above. As such, for the sake of brevity, descriptions of features described with reference to FIGS. 1A to 4B are briefly given below or omitted.

Referring to FIG. 5A, in an image sensor 100, according to an embodiment, a shared pixel SP may include four subpixels Sub-P1 to Sub-P4. Each of the subpixels Sub-P1 to Sub-P4 may include two PDs 120. That is, the image sensor 100, according to an embodiment, may perform an AF, based on a 2PD structure of each of the subpixels Sub-P1 to Sub-P4. An AF operation performed by the image sensor 100, according to an embodiment, is described with reference to FIGS. 6A and 6B.

For reference, the AF may be performed by various schemes generally. For example, the AF may be performed by a scheme such as, but not limited to, a contrast AF, a phase difference AF, an imaging surface phase difference AF, or a dual pixel AF. Here, the dual pixel AF scheme may refer to a scheme which uses two or more PDs 120 as one subpixel, each PD of a subpixel may be individually controlled and may operate like a phase difference sensor by using a light sensing signal of each PD in a case where AF information is used, and light sensing signals of PDs may be summated and output as one image signal in a case where image information is used. The image sensor 100a, according to an embodiment, may perform the AF, based on the dual pixel AF scheme using two PDs 120 of a subpixel Sub-P.

The image sensor 100, according to an embodiment, may be the image sensor 100 of FIG. 1A. Accordingly, the image sensor 100, according to an embodiment, may have a structure where one FD region 110 is disposed at a center portion of the shared pixel SP and a transfer transistor 130 is provided in each of unit pixels Pu. However, the present disclosure is not limited in this regard. For example, the image sensor 100, according to an embodiment, may have a structure of the image sensor 100a of FIG. 4A. Accordingly, the image sensor 100, according to an embodiment, may have a structure where one first FD region 110-1 is disposed at the center portion of the shared pixel SP, a second FD region 110-2 is provided in each unit pixel Pu, a first transfer transistor 130-1 is disposed in each unit pixel Pu, and a ring-shaped second transfer transistor 130-2 surrounds the first FD region 110-1.

Referring to FIG. 5B, in an image sensor 100b, according to an embodiment, a shared pixel SPb may include four subpixels (e.g., first to fourth subpixels) Sub-P1, Sub-P2', Sub-P3, and Sub-P4'. However, unlike the image sensor 110 of FIG. 5A, two of the four subpixels Sub-P1, Sub-P2', Sub-P3, and Sub-P4' may each include two PDs 120, and the others may each include one PD 120. For example, each of the first and third subpixels Sub-P1 and Sub-P3 may include two PDs 120. For another example, each of the second and fourth subpixels Sub-P2' and Sub-P4' may include one PDs 120. When arranged symmetrically, in the shared pixel SPb, positions of the first and third subpixels Sub-P1 and Sub-P3 and positions of the second and fourth subpixels Sub-P2' and Sub-P4' may switch therebetween.

The image sensor 100b, according to an embodiment, may perform an AF, based on a 2PD structure of each of the first and third subpixels Sub-P1 and Sub-P3. An AF operation performed by the image sensor 100b, according to an embodiment, is described with reference to FIGS. 7A and 7B.

Referring to FIG. 5C, an image sensor 100c, according to an embodiment, may perform an AF by using two subpixels Sub-P1' and Sub-P3', and thus, may be similar to the image sensor 100b of FIG. 5B but a structure of each of the two subpixels Sub-P1' and Sub-P3' may differ from a structure of each of the two subpixels Sub-P1 and Sub-P3 of the image sensor 100b of FIG. 5B. For example, in an image sensor 100c, according to an embodiment, a shared pixel SPb may include four subpixels (e.g., first to fourth subpixels) Sub-P1' to Sub-P4'. Alternatively or additionally, two of the subpixels Sub-P1' to Sub-P4' may each include three PDs 120, and the others may each include one PD 120. For example, each of the first and third subpixels Sub-P1' and Sub-P3' may include three PDs 120. For example, each of the second and fourth subpixels Sub-P2' and Sub-P4' may include one PD 120. Each of the first and third subpixels Sub-P1' and Sub-P3' may include the three PDs 120, and thus, may more precisely perform an AF.

When arranged symmetrically, in the shared pixel SPb, positions of the first and third subpixels Sub-P1' and Sub-P3' and positions of the second and fourth subpixels Sub-P2' and Sub-P4' may switch therebetween. The image sensor 100b, according to an embodiment, may perform the AF, based on a 3PD structure of each of the first and third subpixels Sub-P1' and Sub-P3'.

Hereinabove, a structure where a subpixel includes two or three PDs has been described for an AF operation, but the number of PDs included in a subpixel performing an AF operation is not limited to two or three.

Figure 6A:
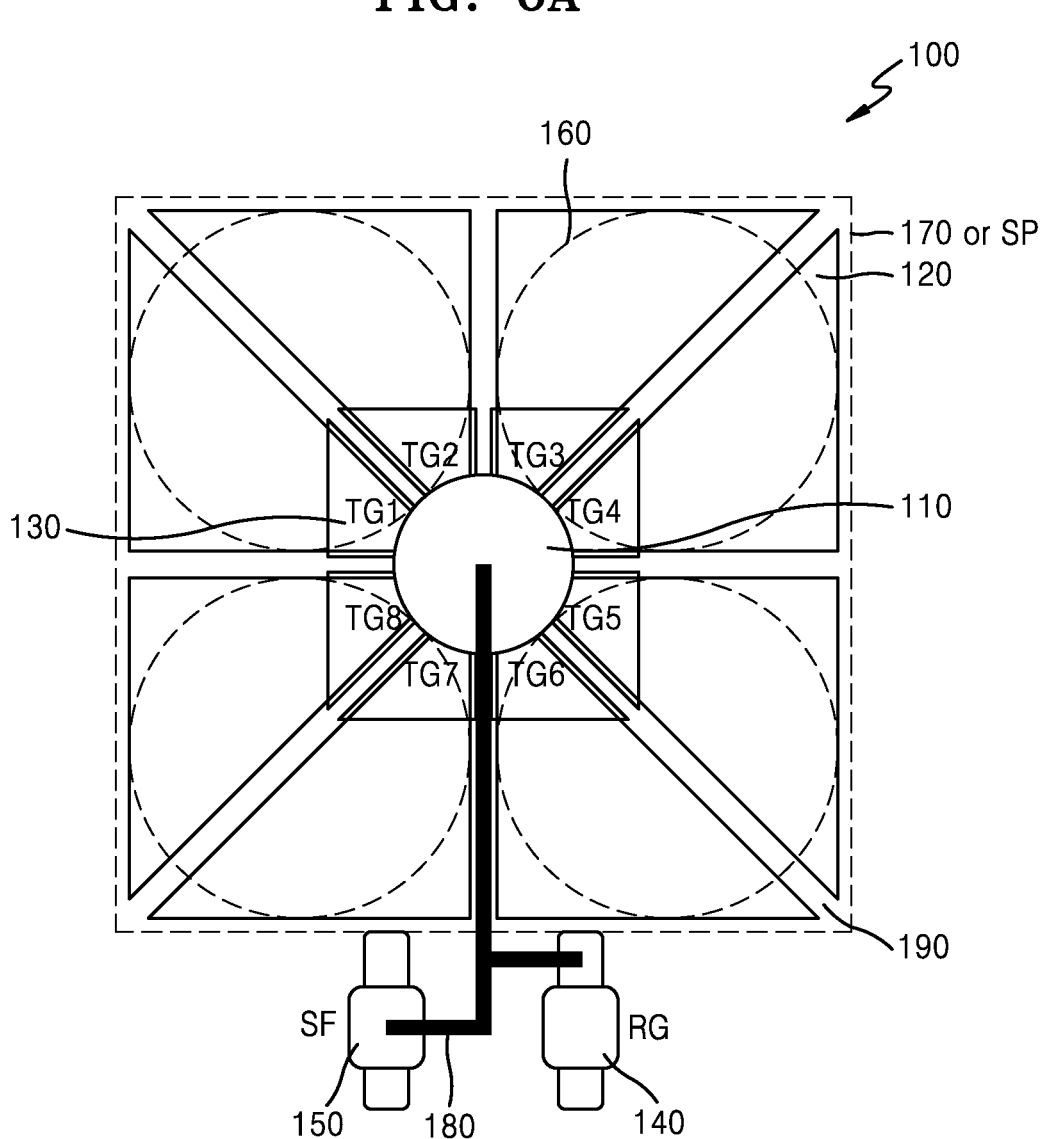
FIGS. 6A and 6B are a plan view and a signal timing diagram for describing high sensitivity and an auto focus operation in the image sensor of FIG. 5A, according to an embodiment.
Figure 6B:
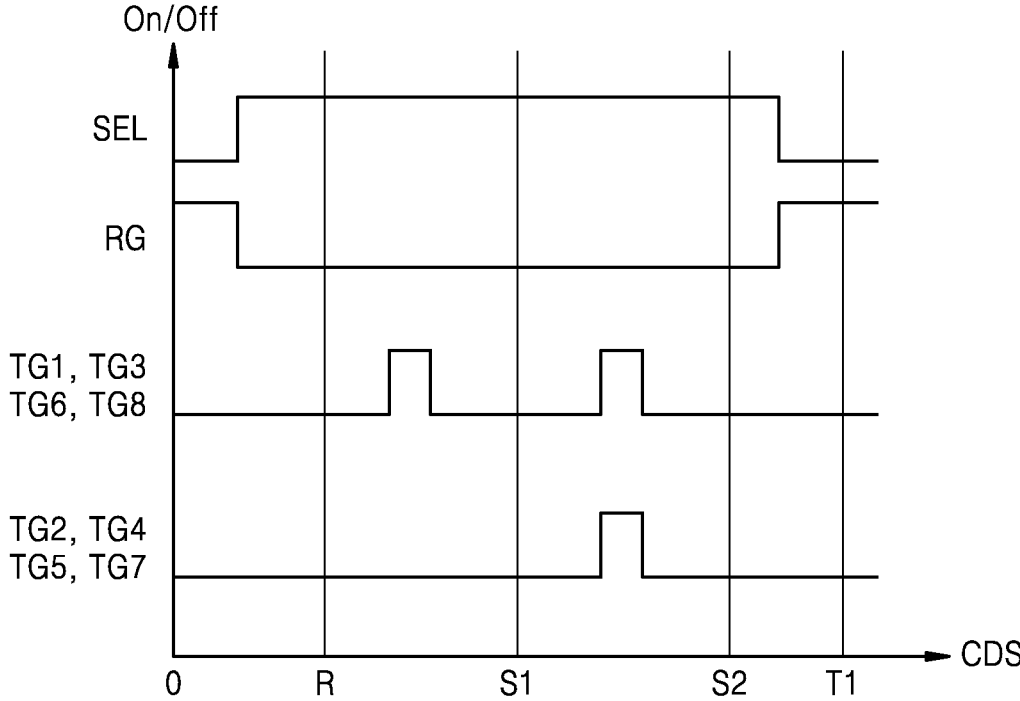
Figure 7A:
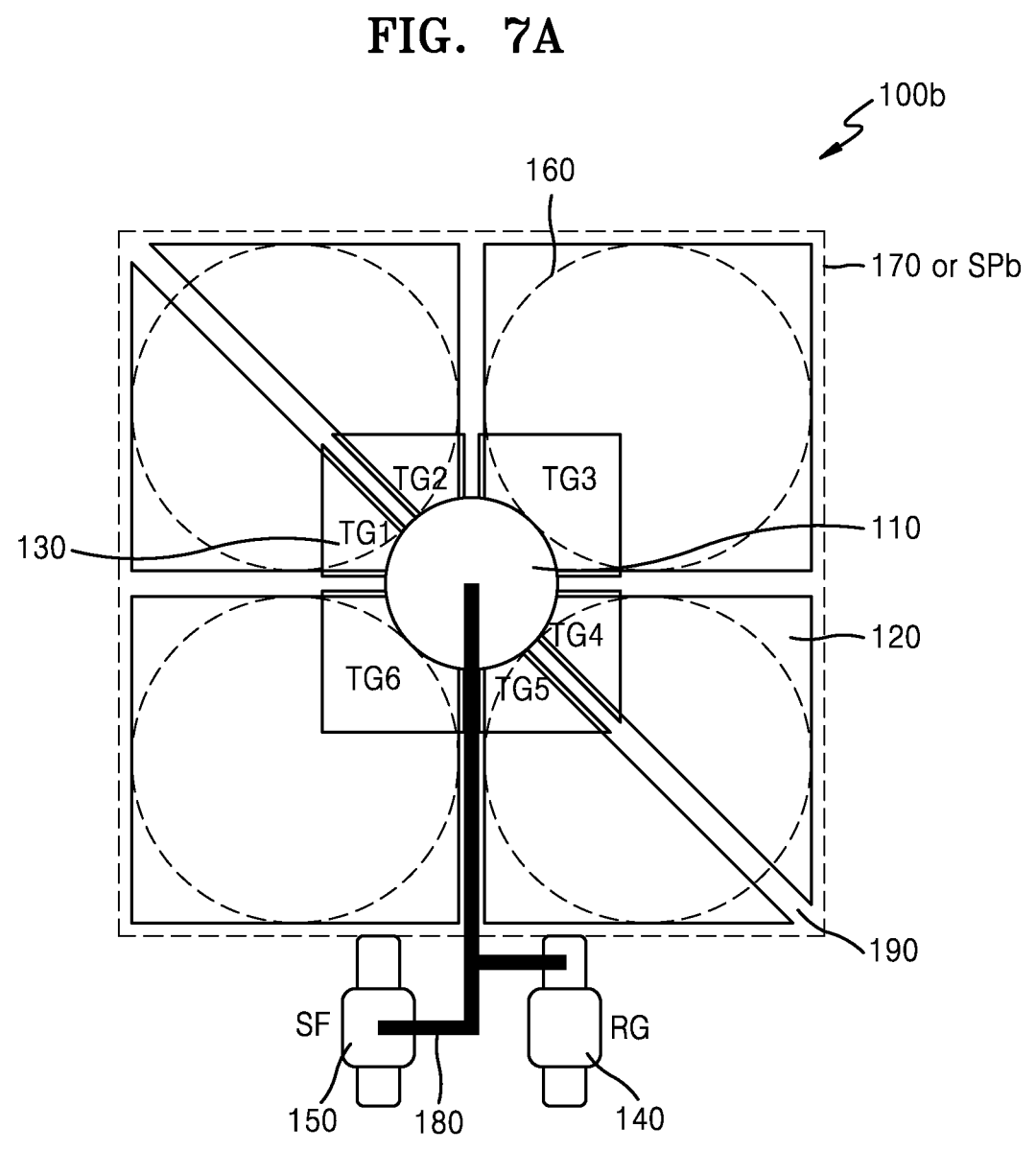
Figure 7B:
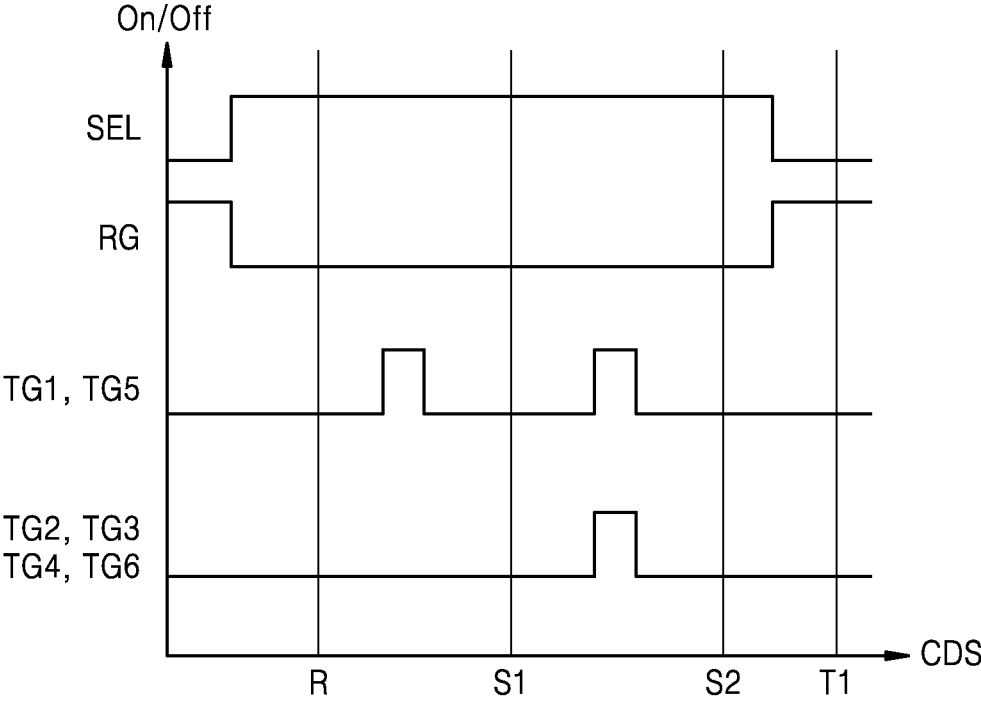
Figure 7C:
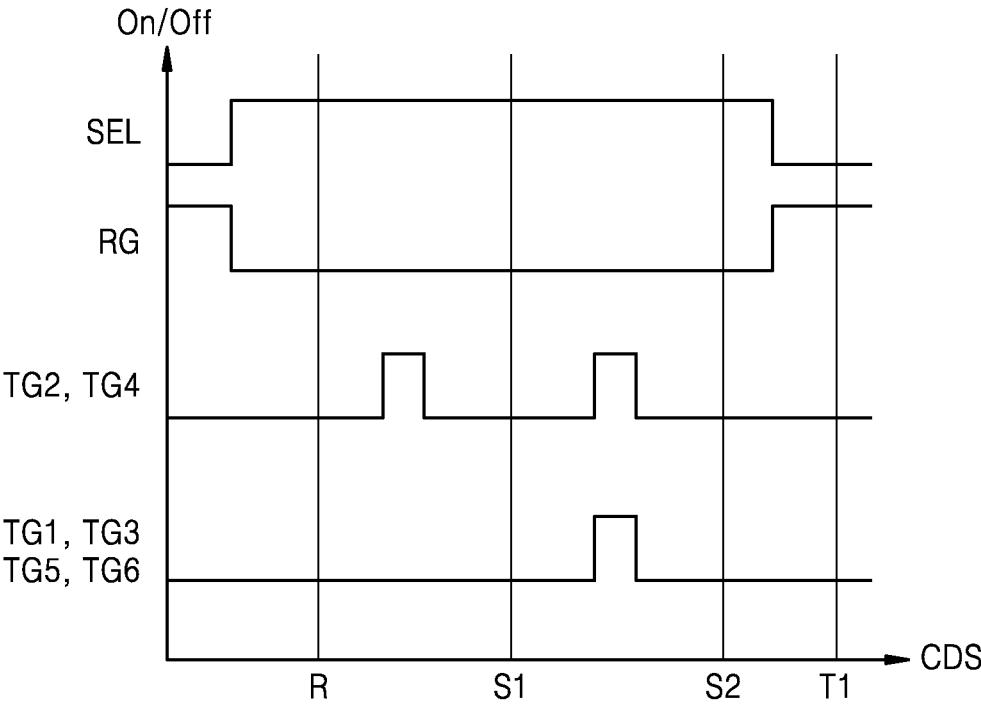

FIGS. 6A and 6B are a plan view and a signal timing diagram for describing high sensitivity and an auto focus operation in the image sensor of FIG. 5A, according to an embodiment. FIGS. 7A to 7C are a plan view and signal timing diagrams for describing high sensitivity and an auto focus operation in the image sensor of FIG. 5B, according to an embodiment. FIGS. 6A and 7A schematically illustrate a structure of a shared pixel SP and illustrate a case where a reset transistor 140 and a source follower transistor 150 are provided outside the shared pixel SP, based on only an AF operation. In FIGS. 6B, 7B, and 7C, the x axis represents a time for correlated double sampling (CDS), and the y axis represents an on/off level.

Referring to FIGS. 6A and 6B, a shared pixel SP of an image sensor 100, according to an embodiment, may include four subpixels, and each of the subpixels may include two PDs 120. That is, each of the subpixels may have a 2PD structure. In FIG. 6A, each subpixel may correspond to one ML 160.

In the image sensor 100, according to an embodiment, a time for CDS may be divided into four periods. First, in a first period (e.g., time 0 to R), which may be referred to as a reset read period, an FD region may be reset, and then, as a selection transistor 155T of the shared pixel SP is turned on and a reset transistor 140 is turned off, an output signal based on a reset voltage may be sampled. Transfer transistors TG1 to TG8 130 may be maintained in an off state.

Subsequently, in a second period (e.g., time R to S1), which may be referred to as a first sampling period, transfer transistors TG1, TG3, TG6, and TG8 130 of a left PD 120 of the two PDs 120 of each subpixel may be turned on and off, and thus, a first electric charge may be accumulated into an FD region 110 and sampled.

In a third period (e.g., time S1 to S2), which may be referred to as a second sampling period, transfer transistors TG1 to TG8 130 of a left PD 120 of the two PDs 120 of each subpixel may be turned on and off, and thus, a second electric charge may be accumulated into the FD region 110 and sampled.

Finally, in a fourth period (e.g., time S2 to T1), which may be referred to as a last period, a selection transistor 155T may be turned off, and a reset transistor 140 may be turned on. Alternatively or additionally, in the fourth period (e.g., time S2 to T1), the transfer transistors TG1 to TG8 130 may be maintained in an off state. Subsequently, the first period to the fourth period may repeatedly operate.

The electric charges (e.g., the second electric charge) generated by the eight PDs 120 in the third period (e.g., time S1 to S2) may be sampled, and thus, may be used as an image signal for implementing high sensitivity. The first electric charge accumulated through the transfer transistors TG1, TG3, TG6, and TG8 130 in the second period (e.g., time R to S1) may correspond to an electric charge generated by a left PD 120 of two PDs 120 of each of MLs 160. The second electric charge accumulated through the transfer transistors TG1 to TG8 130 in the third period (e.g., time S1 to S2) may correspond to electric charges generated by the eight PDs 120. Accordingly, a third electric charge, which may be an electric charge generated by a right PD 120 of the two PDs 120 of each ML 160, may be calculated by subtracting the first electric charge from the second electric charge. Subsequently, AF information may be generated from the first electric charge and the third electric charge.

As described above, an AF may be implemented by using comparison of electric charges generated by two PDs and a light phase difference based thereon, and a more accurate AF may be performed by using two kinds of classified PDs of eight PDs. In the high resolution mode, by adjusting an appropriate on/off timing of each of pixel transistors, electric charges generated by a PD 120 corresponding to a subpixel or a unit pixel may be individually accumulated into an FD region 110 and sampled, and thus, may be used as an image signal.

Referring to FIGS. 7A to 7C, a shared pixel SPb of an image sensor 100*b*, according to an embodiment, may include four subpixels, two of the four subpixels may each include two PDs 120, and the other may each include one PD 120. Therefore, only two of the four subpixels may have a 2PD structure and may perform an AF. In FIG. 7A, each subpixel may correspond to an ML 160.

The shared pixel SPb of the image sensor 100*b*, according to an embodiment, may be classified into two kinds of shared pixels for an AF operation. For example, a plurality of shared pixels SPb included in the image sensor 100*b* may be classified into a first shared pixel and a second shared pixel. Alternatively or additionally, in each of the first shared pixel and the second shared pixel, a time for CDS may be divided into four periods.

First, in the first shared pixel, in a first period (e.g., time 0 to R), which may be referred to as a reset read period, an FD region may be reset, and then, as a selection transistor 155T of the first shared pixel is turned on and a reset transistor 140 is turned off, an output signal based on a reset voltage may be sampled. Transfer transistors TG1 to TG6 130 may be maintained in an off state.

Subsequently, in a second period (e.g., time R to S1), which may be referred to as a first sampling period, transfer transistors TG1 and TG5 130 of a left lower PD 120 of the two PDs 120 of each of MLs 160 of a second quadrant surface and a fourth quadrant surface may be turned on and off, and thus, a first electric charge may be accumulated into an FD region 110 and sampled.

In a third period (e.g., time S1 to S2), which may be referred to as a second sampling period, six transfer transistors TG1 to TG6 130 may be turned on or off, and thus, a second electric charge may be accumulated into the FD region 110 and sampled.

Finally, in a fourth period (e.g., time S2 to T1), which may be referred to as a last period, a selection transistor 155T may be turned off, and a reset transistor 140 may be turned on. Alternatively or additionally, in the fourth period (e.g., time S2 to T1), the transfer transistors TG1 to TG6 130 may be maintained in an off state. Subsequently, the first period to the fourth period may repeatedly operate.

In the second shared pixel, in a first period (e.g., time 0 to R), which may be referred to as a reset read period, an FD region may be reset, and then, as a selection transistor 155T of the second shared pixel is turned on and a reset transistor 140 is turned off, an output signal based on a reset voltage may be sampled. Transfer transistors TG1 to TG6 130 may be maintained in an off state.

Subsequently, in a second period (e.g., time R to S1), which may be referred to as a first sampling period, transfer transistors TG2 and TG4 130 of a right upper PD 120 of the two PDs 120 of each subpixel of a second quadrant surface and a fourth quadrant surface may be turned on and off, and thus, a first electric charge may be accumulated into an FD region 110 and sampled.

In a third period (e.g., time S1 to S2), which may be referred to as a second sampling period, six transfer transistors TG1 to TG6 130 may be turned on or off, and thus, a second electric charge may be accumulated into the FD region 110 and sampled.

Finally, in a fourth period (e.g., time S2 to T1), which may be referred to as a last period, a selection transistor 155T may be turned off, and a reset transistor 140 may be turned on. Alternatively or additionally, in the fourth period (e.g., time S2 to T1), the transfer transistors TG1 to TG6 130 may be maintained in an off state. Subsequently, the first period to the fourth period may repeatedly operate.

In a third period (e.g., time S1 to S2) of each of the first shared pixel and the second shared pixel, electric charges (e.g., a second electric charge) generated by six PDs 120 may be sampled, and thus, may be used as an image signal for implementing high sensitivity. In a second period (e.g., time R to S1) of the first shared pixel, a first electric charge accumulated through the transfer transistors TG1 and TG5 may correspond to an electric charge generated by a left lower PD 120 of two PDs 120 of each of MLs 160 of a second quadrant surface and a fourth quadrant surface. Alternatively or additionally, in a second period (e.g., time R to S1) of the second shared pixel, a first electric charge accumulated through the transfer transistors TG2 and TG4 may correspond to an electric charge generated by a right upper PD 120 of the two PDs 120 of each ML 160 of the second quadrant surface and the fourth quadrant surface. Accordingly, AF information may be generated from the first electric charge of the second period (e.g., time R to S1) of the first shared pixel and the third electric charge of the second period (e.g., time R to S1) of the second shared pixel.

Figure 8:
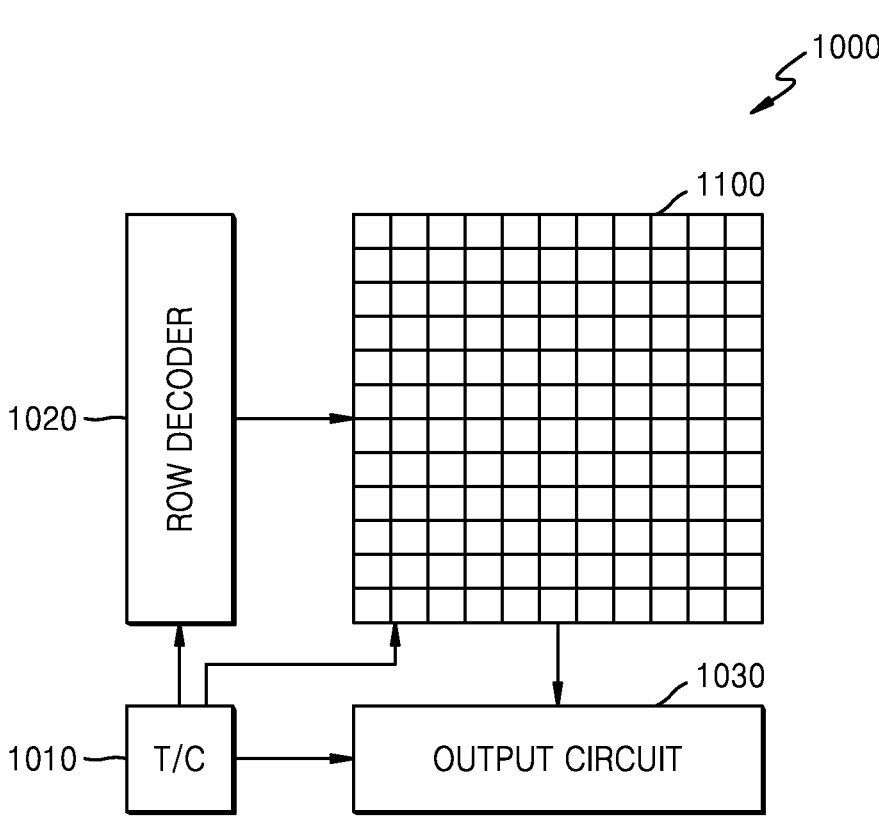
FIG. 8 is a block structure diagram of an image sensor entirely, according to an embodiment.

FIG. 8 is a block structure diagram of an image sensor 1000 entirely, according to an embodiment. FIG. 8 is described with reference to FIG. 1A, and descriptions which are the same as or similar to the descriptions of FIGS. 1A to 7B, for the sake of brevity, are briefly given below or omitted.

Referring to FIG. 8, the image sensor 1000, according to an embodiment, may include a pixel array 1100, a timing controller 1010, a row decoder 1020, and an output circuit 1030. The image sensor 1000, according to an embodiment, may include, but not limited to, a charge coupled device (CCD) image sensor or a CMOS image sensor.

The image sensor 1000, according to an embodiment, may include or may be similar in many respects to at least one of the image sensors above with reference to FIGS. 1A, 4A, and 5A to 5C, and may include additional features not mentioned above. Therefore, the pixel array 1100 may include a plurality of unit pixels Pu and/or shared pixels SP, which are arranged in a 2D array structure along a plurality of rows and a plurality of columns. The row decoder 1020 may select one row from among the plurality of rows of the pixel array 1100 in response to a row address signal output from the timing controller 1010. The output circuit 1030 may output an image signal by column units from the plurality of unit pixels Pu and/or shared pixels SP arranged along the selected row. The output circuit 1030 may include an ADC. For example, the output circuit 1030 may include a plurality of ADCs provided for each column between a column decoder and the pixel array 1100, and/or may include one ADC disposed at an output terminal of the column decoder. According to an embodiment, the timing controller 1010, the row decoder 1020, and the output circuit 1030 may be implemented as one chip. Alternatively or additionally, the timing controller 1010, the row decoder 1020, and the output circuit 1030 may each be implemented as an individual chip.

Figure 9:
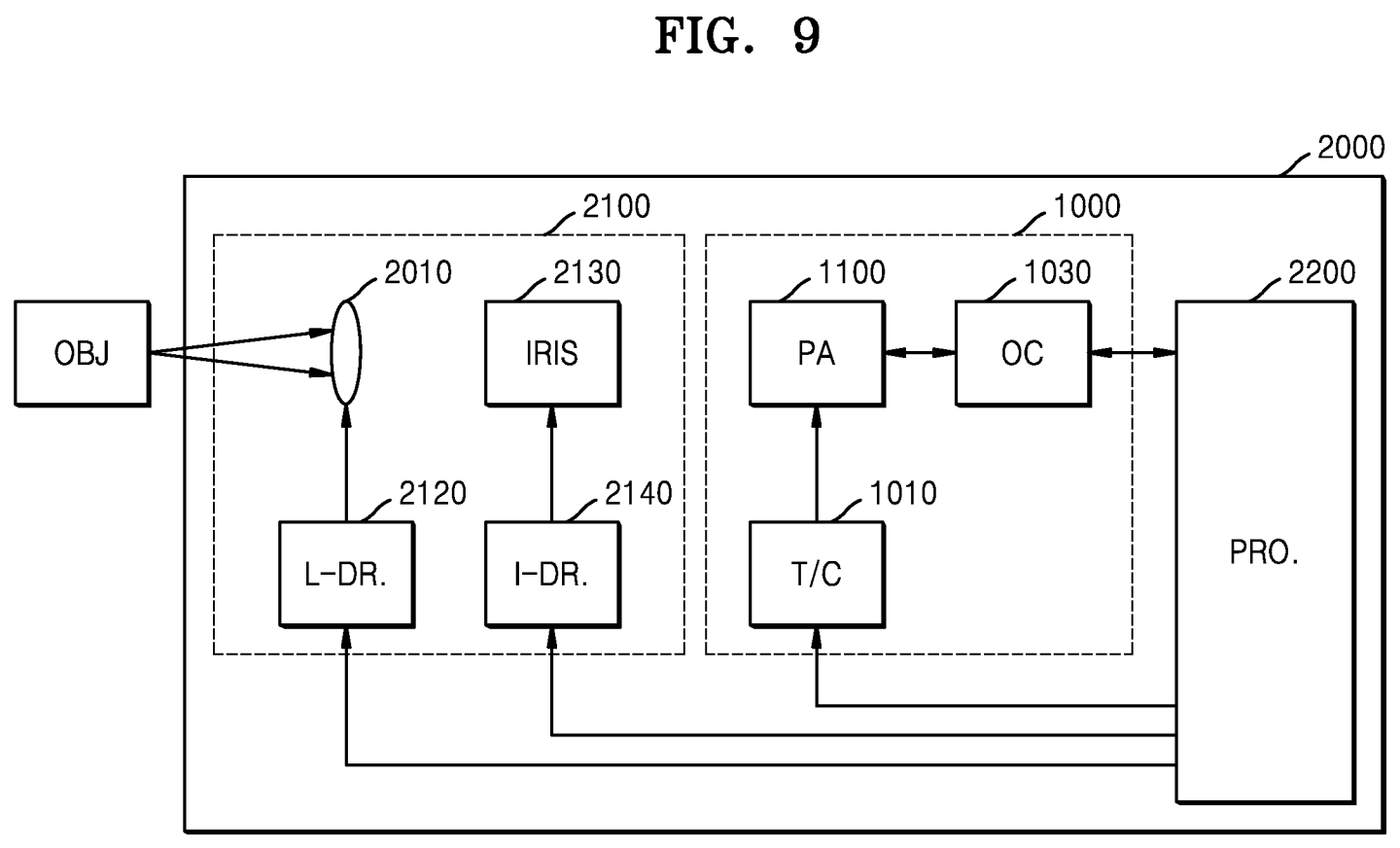

FIG. 9 is a block structure diagram of an electronic device 2000 including an image sensor, according to an embodiment. FIG. 9 is described with reference to FIGS. 1A and 8, and descriptions which are the same as or similar to the descriptions of FIGS. 1A to 8, for the sake of brevity, are briefly given below or omitted.

Referring to FIG. 9, the electronic device 2000 including an image sensor (hereinafter simply referred to as an 'electronic device'), according to an embodiment, may include an imaging unit 2100, an image sensor 1000, and a processor 2200. The electronic device 2000 may be, for example, a camera. The imaging unit 2100 may collect light reflected from an object OBJ to form an optical image. The imaging unit 2100 may include an objective lens 2010, a lens driver 2120, an aperture 2130, and an aperture driver 2140. In FIG. 9, only one lens is representatively illustrated for convenience, but the objective lens 2010 may include a plurality of lenses having different sizes and shapes. In some embodiments, the electronic device 2000 may be a mobile camera, and in the mobile camera, the aperture 2130 and the aperture driver 2140 may be omitted.

The lens driver 2120 may communicate with the processor 2200 on information about focus detection and may adjust a position of the objective lens 2010, based on a control signal provided from the processor 2200. The lens driver 2120 may move the objective lens 2010 to adjust a distance between the objective lens 2010 and the object OBJ, and/or may adjust positions of individual lenses (not shown) of the objective lens 2010. As the lens driver 2120 drives the objective lens 2010, a focus on the object OBJ may be adjusted. Alternatively or additionally, the lens driver 2120 may receive AF information to adjust positions of individual lenses of the objective lens 2010, so as to focus thereon.

The aperture driver 2140 may communicate with the processor 2200 on information about the amount of light and may adjust the aperture 2130, based on a control signal provided from the processor 2200. For example, the aperture driver 2140 may increase or decrease the degree of opening of the aperture 2130, based on the amount of light supplied into the electronic device 2000 through the objective lens 2010. Alternatively or additionally, the aperture driver 2140 may adjust an opening time of the aperture 2130.

The image sensor 1000 may generate an electric image signal, based on the intensity of incident light. The image sensor 1000 may include or may be similar in many respects to at least one of the image sensors above with reference to FIGS. 1A, 4A, and 5A to 5C, and may include additional features not mentioned above. Alternatively or additionally, the image sensor 1000 may include or may be similar in many respects to at least the image sensor 1000 of FIG. 8, and may include additional features not mentioned above. Therefore, the image sensor 1000 may include a pixel array 1100, a timing controller 1010, and an output circuit 1030. Alternatively or additionally, the image sensor 1000 may further include a row decoder 1020 (not shown).

The processor 2200 may control the overall operation of the electronic device 2000 and may include an image processing function. For example, the processor 2200 may provide a control signal for an operation of each of elements such as the lens driver 2120, the aperture driver 2140, and the timing controller 1010. In the image sensor 1000, according to an embodiment, as described above, in the shared pixel SP included in the pixel array 1100, the FD region 110 may be disposed at a center portion thereof, and the FD region 110 may be connected to one source follower transistor 150 through the metal wiring 180. Based on a structure of the shared pixel SP, the image sensor 1000, according to an embodiment, may implement a high CG, based on one FD region 110 and a short metal wiring 180. Alternatively or additionally, because one source follower transistor is used, RN may be minimized. Furthermore, because at least one subpixel Sub-P of the shared pixel SP may have a 2PD structure, an AF operation of each pixel may be performed.

Embodiments have been described by using the terms described herein, but this has been merely used for describing the present disclosure and has not been used for limiting a meaning or limiting the scope of the present disclosure defined in the following claims. Therefore, it may be understood by those of ordinary skill in the art that various modifications and other equivalent embodiments may be implemented from the present disclosure. Accordingly, the spirit and scope of the present disclosure may be defined based on the spirit and scope of the following claims.

While the present disclosure has been particularly shown and described with reference to embodiments thereof, it will be understood that various changes in form and details may be made therein without departing from the spirit and scope of the following claims.

What is claimed is:

1. An image sensor, comprising:
a shared pixel comprising four subpixels, the four subpixels disposed in a 2×2 configuration;
a single first floating diffusion (FD) region at a center portion of the shared pixel, the four subpixels coupled to the single first FD region,
wherein the shared pixel comprises a plurality of unit pixels each comprising a photodiode (PD), the plurality of the unit pixels disposed around the single first FD region, wherein at least two of the plurality of unit pixels are separated from one another by a deep trench isolation (DTI); and
a plurality of first transfer transistors disposed adjacent to the single first FD region, wherein each of the plurality of unit pixels comprises one of the plurality of first transfer transistors,
wherein a first unit pixel of the plurality of unit pixels comprises a reset transistor disposed adjacent to an outer portion of the shared pixel,
wherein a second unit pixel of the plurality of unit pixels is disposed adjacent to the first unit pixel and comprises a source follower transistor disposed at the outer portion of the shared pixel,
wherein the single first FD region is coupled, through a metal wiring, to a source region of the reset transistor and a gate of the source follower transistor,
wherein a first plurality of subpixels comprises at least two subpixels of the four subpixels, wherein each of the first plurality of subpixels comprises at least two unit pixels of the plurality of unit pixels, and
wherein the first plurality of subpixels comprises two subpixels of the four subpixels that are symmetric to each other with respect to the single first FD region, and each of the first plurality of subpixels comprises two or more unit pixels.

2. The image sensor of claim 1, further comprising:
a color filter (CF) coupled to the shared pixel; and
a plurality of micro-lenses (MLs), wherein each ML of the plurality of MLs is coupled to at least one subpixel of the four subpixels of the shared pixel.

3. The image sensor of claim 1, wherein:
the first plurality of subpixels comprises the four subpixels of the shared pixel, and each of the first plurality of subpixels comprises two unit pixels.

4. The image sensor of claim 1, wherein:
each of the first plurality of subpixels comprises two unit pixels, and
wherein a second plurality of subpixels comprises two subpixels of the four subpixels different from the subpixels of the first plurality of subpixels, wherein each of the second plurality of subpixels comprises one unit pixel.

5. The image sensor of claim 1, wherein:
a second plurality of subpixels comprises two subpixels of the four subpixels
different from the subpixels of the first plurality of subpixels, where each of the second plurality of subpixels comprises one unit pixel.

6. The image sensor of claim 1, further comprising:
a second FD region disposed adjacent to the single first FD region in each of the plurality of unit pixels; and a second transfer transistor disposed between the single first FD region and the second FD region.

7. The image sensor of claim 6, wherein the second transfer transistor is disposed in a circular ring shape around an outer circumference of the single first FD region.

8. The image sensor of claim 1,
wherein each of the plurality of unit pixels other than the first unit pixel and the second unit pixel comprises a dummy gate corresponding to a gate of at least one of the source follower transistor and the reset transistor.

9. The image sensor of claim 8, wherein the dummy gate of a third unit pixel of the plurality of unit pixels configures a gate of a selection transistor, wherein the third unit pixel is disposed adjacent to the second unit pixel.

10. The image sensor of claim 1, wherein the image sensor is configured to:
switch between a high resolution mode and a high sensitivity mode,
wherein, in the high resolution mode, the plurality of unit pixels are configured to operate individually, and
wherein, in the high sensitivity mode, the plurality of unit pixels are configured to operate together and configured to generate a plurality of electric charges that are summated.

11. The image sensor of claim 1, wherein each of the at least first subpixels comprises three or more unit pixels.

12. The image sensor of claim 1, wherein the first plurality of subpixels comprises two subpixels of the four subpixels that are symmetric to each other with respect to an axis of symmetry intersecting the first FD region.

13. An image sensor, comprising:
a first floating diffusion (FD) region disposed at a center portion of a shared pixel corresponding to one color filter,
wherein the shared pixel comprises eight unit pixels, each comprising a photodiode (PD), the eight unit pixels disposed around the first FD region, wherein at least two of the eight unit pixels are separated from one another by a deep trench isolation (DTI) a plurality of first transfer transistors disposed adjacent to the first FD region, wherein each of the eight unit pixels comprises one of the plurality of first transfer transistors;
four micro-lenses (MLs) disposed in a 2×2 configuration on the eight unit pixels in the shared pixel, wherein the four MLs are disposed around the first FD region;
a second FD region disposed adjacent to the first FD region in each of the eight unit pixels; and
a second transfer transistor disposed between the first FD region and the second FD region,
wherein the second transfer transistor is disposed in a circular ring shape around an outer circumference of the first FD region,
wherein a first unit pixel of the eight unit pixels comprises a reset transistor disposed adjacent to an outer portion of the shared pixel,
wherein a second unit pixel of the eight unit pixels is disposed adjacent to the first unit pixel and comprises a source follower transistor disposed adjacent to the outer portion of the shared pixel,
wherein the first FD region is coupled, through a metal wiring, to a source region of the reset transistor and a gate of the source follower transistor, and
wherein two unit pixels of the eight unit pixels are disposed under each of the four MLs and configure a subpixel of the shared pixel and are configured to generate a light sensing signal for auto focus (AF) information.

14. The image sensor of claim 13, further comprising:
wherein each of the eight unit pixels other than the first unit pixel and the second unit pixel comprises a dummy gate corresponding to a gate of at least one of the source follower transistor and the reset transistor,
wherein the dummy gate of a third unit pixel of the eight unit pixels configures a gate of a selection transistor, and
wherein the third unit pixel is disposed adjacent to the second unit pixel.

15. The image sensor of claim 13, wherein the image sensor is configured to:
switch between a high resolution mode and a high sensitivity mode,
wherein, in the high resolution mode, the eight unit pixels are configured to operate individually, and
wherein, in the high sensitivity mode, the eight unit pixels are configured to operate together and configured to generate a plurality of electric charges that are summated.

16. The image sensor of claim 15, wherein:
the shared pixel further comprises a selection transistor,
wherein the two unit pixels disposed under each of the four MLs comprise a left unit pixel and a right unit pixel, the left unit pixel comprising a left first transfer transistor of the plurality of first transfer transistors, and
the high sensitivity mode comprises a plurality of time periods,
wherein, in a first time period of the plurality of time periods, the selection transistor is turned on and the reset transistor is turned off,
wherein, in a second period of the plurality of time periods, the left first transfer transistor is turned on and off and the first FD region is configured to accumulate a first electric charge,
wherein, in a third period of the plurality of time periods, each one of the plurality of first transfer transistors is turned on and off and the first FD region is configured to accumulate a second electric charge,
wherein, in a fourth period of the plurality of time periods, the selection transistor is turned off and the reset transistor is turned on,
wherein the second electric charge is configured as an image signal in the high sensitivity mode,
wherein a third electric charge is configured to be obtained by subtracting the first electric charge from the second electric charge, and
wherein the first electric charge and the third electric charge are configured to generate the AF information.

17. An image sensor, comprising:
a first floating diffusion (FD) region disposed at a center portion of a shared pixel corresponding to one color filter;
six unit pixels disposed in the shared pixel, each comprising a photodiode (PD), the six unit pixels disposed around the first FD region, wherein at least two of the six unit pixels are separated from one another by a deep trench isolation (DTI);
a plurality of first transfer transistors disposed adjacent to the first FD region, wherein each of the six unit pixels comprises at least one of the plurality of first transfer transistors; and four micro-lenses (MLs) disposed in a 2×2 configuration on the six unit pixels in the shared pixel, wherein the four MLs are disposed around the first FD region,
wherein a first unit pixel of the six unit pixels comprises a reset transistor disposed adjacent to an outer portion of the shared pixel,
wherein a second unit pixel of the six unit pixels is disposed adjacent to the first unit pixel and comprises a source follower transistor disposed adjacent to the outer portion of the shared pixel,
wherein each of the plurality of unit pixels other than the first unit pixel and the second unit pixel comprises a dummy gate corresponding to a gate of at least one of the reset transistor and the source follower transistor,
wherein the first FD region is coupled, through a metal wiring, to a source region of the reset transistor and a gate of the source follower transistor,
wherein the four MLs comprise a first ML, a second ML, a third ML, and a fourth ML, where the first ML and the second ML are symmetric with each other with respect to the first FD region,
wherein a first two unit pixels of the six unit pixels is disposed under the first ML and a second two unit pixels of the six unit pixels is disposed under the second ML, and the first and second two unit pixels configure a subpixel of the shared pixel and are configured to generate auto focus (AF) information using a light sensing signal,
and one unit pixel of the six unit pixels is disposed under each of the third ML and the fourth ML and each one unit pixel configures a subpixel of the shared pixel.

18. The image sensor of claim 17, further comprising:
a second FD region disposed adjacent to the first FD region in each of the six unit pixels; and
a second transfer transistor disposed between the first FD region and the second FD region,
wherein the second transfer transistor is disposed in a circular ring shape around an outer circumferences of the first FD region.

19. The image sensor of claim 17, wherein the image sensor is configured to:
switch between a high resolution mode and a high sensitivity mode,
wherein, in the high resolution mode, the six unit pixels are configured to operate individually, and
wherein, in the high sensitivity mode, the six unit pixels are configured to operate together and configured to generate a plurality of electric charges that are summated.

20. The image sensor of claim 19, wherein:
wherein the two unit pixels disposed under the each of the first ML and the second ML each comprise left unit pixels and right unit pixels, the left unit pixels each comprising a left first transfer transistor of the plurality of first transfer transistors, the right unit pixels each comprises a right first transfer transistor of the plurality of first transfer transistors, and
the high sensitivity mode comprises a plurality of time periods, the plurality of time periods comprising a first time period, a second time period, a third time period, and a fourth time period,
the shared pixel comprises a first shared pixel and a second shared pixel,
wherein, in the first time period of the first shared pixel, a selection transistor of the first shared pixel is turned on and a reset transistor of the first shared pixel is turned off, wherein, in the second time period of the first shared pixel, the left first transfer transistor of each left unit pixel is turned on and off and the first FD region is configured to accumulate a first electric charge, wherein, in the third time period of the first shared pixel, each of the plurality of first transfer transistors is turned on and off and the first FD region is configured to accumulate a second electric charge, wherein, in the fourth time period of the first shared pixel, the selection transistor is turned off and the reset transistor is turned on, wherein, in the first time period of the second shared pixel, a selection transistor of the second shared pixel is turned on and a reset transistor of the second shared pixel is turned off, wherein, in the second time period of the second shared pixel, the right first transfer transistor of each right unit pixel is turned on and off and the first FD region is configured to accumulate the first electric charge, wherein, in the third time period of the second shared pixel, each of the plurality of first transfer transistors is turned on and off and the first FD region is configured to accumulate the second electric charge, wherein, in the fourth time period of the second shared pixel, the selection transistor is turned off and the reset transistor is turned on, wherein, in each of the first shared pixel and the second shared pixel, the second electric charge is configured as an image signal in the high sensitivity mode, and wherein, the first electric charge of the first shared pixel and the first electric charge of the second shared pixel are configured to generate the AF information.

* * * * *